(12) United States Patent
Saito et al.

(10) Patent No.: US 10,962,738 B2
(45) Date of Patent: Mar. 30, 2021

(54) INFORMATION PROCESSING APPARATUS AND INFORMATION PROCESSING METHOD TO CALIBRATE LINE-OF-SIGHT OF A USER

(71) Applicant: SONY CORPORATION, Tokyo (JP)

(72) Inventors: Mari Saito, Kanagawa (JP); Kenji Sugihara, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/487,514

(22) PCT Filed: Dec. 28, 2017

(86) PCT No.: PCT/JP2017/047366
§ 371 (c)(1),
(2) Date: Aug. 21, 2019

(87) PCT Pub. No.: WO2018/179661
PCT Pub. Date: Oct. 4, 2018

(65) Prior Publication Data
US 2020/0018926 A1 Jan. 16, 2020

(30) Foreign Application Priority Data
Mar. 27, 2017 (JP) .............................. JP2017-060995

(51) Int. Cl.
*G02B 7/28* (2006.01)
*G02B 7/00* (2021.01)
*G06F 3/01* (2006.01)

(52) U.S. Cl.
CPC ............. *G02B 7/287* (2013.01); *G02B 7/003* (2013.01); *G06F 3/013* (2013.01); *G06F 3/016* (2013.01)

(58) Field of Classification Search
CPC ......... G02B 7/287; G02B 7/003; G06F 3/013; G06F 3/016
See application file for complete search history.

(56) References Cited

U.S. PATENT DOCUMENTS

| 2010/0165093 | A1 | 7/2010 | Sugio et al. |
| 2016/0342205 | A1* | 11/2016 | Shigeta ................. A61B 5/163 |
| 2018/0046851 | A1* | 2/2018 | Kienzle ................ G06F 3/0481 |

FOREIGN PATENT DOCUMENTS

| CN | 101677762 A | 3/2010 |
| JP | 2005-261728 A | 9/2005 |
| JP | 2007-213469 A | 8/2007 |
| WO | 2009/107371 A1 | 9/2009 |

OTHER PUBLICATIONS

International Search Report and Written Opinion of PCT Application No. PCT/JP2017/047366, dated Mar. 6, 2018, 06 pages of ISRWO.

* cited by examiner

*Primary Examiner* — Sahlu Okebato
(74) *Attorney, Agent, or Firm* — Chip Law Group

(57) ABSTRACT

An information processing apparatus includes: a line-of-sight information acquisition unit that acquires line-of-sight information of a user and a calibration execution unit that executes calibration on the basis of a position of a target object in a visual field and the line-of-sight information, the target object has a visual attraction degree higher than a first threshold and a size in a predetermined direction smaller than a predetermined size, in a case where the target object has been detected from the visual field of the user.

19 Claims, 17 Drawing Sheets

FIG. 1
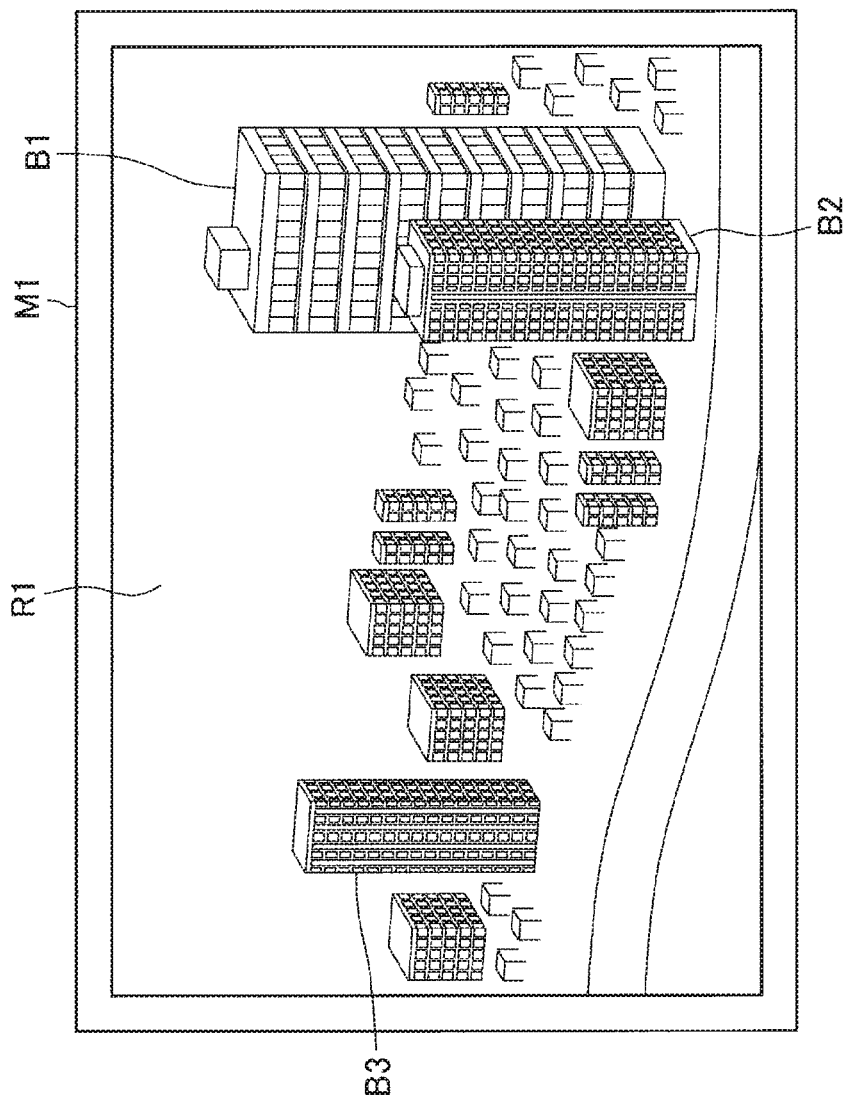
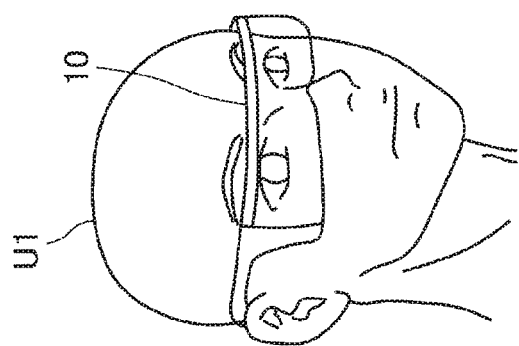

INFORMATION PROCESSING APPARATUS AND INFORMATION PROCESSING METHOD TO CALIBRATE LINE-OF-SIGHT OF A USER

CROSS REFERENCE TO RELATED APPLICATIONS

This application is a U.S. National Phase of International Patent Application No. PCT/JP2017/047366 filed on Dec. 28, 2017, which claims priority benefit of Japanese Patent Application No. JP 2017-060995 filed in the Japan Patent Office on Mar. 27, 2017. Each of the above-referenced applications is hereby incorporated herein by reference in its entirety.

TECHNICAL FIELD

The present disclosure relates to an information processing apparatus, an information processing method, and a program.

BACKGROUND ART

In recent years, a technology of executing processing according to the line-of-sight of a user has been developed. However, an eye structure is usually different among users. For example, the users usually have different sizes of eyeballs. Furthermore, the positional relationship between the eyes of the user and a device can vary depending on differences in the devices used by the users. Therefore, there is a possibility that an error occurs in the detection of the line-of-sight of the user, and a technology for improving the accuracy of the detection of the line-of-sight of the user has also been developed.

For example, a technology of performing calibration of the line-of-sight before the detection of the line-of-sight of the user has been developed. For example, in the technology described in Patent Document 1 below, the calibration is executed on the basis of the line-of-sight of a user and a set position of an image utilized to determine whether or not to unlock. Moreover, in the technology described in Patent Document 2 below, the calibration is executed on the basis of a position of an object manipulatable by a user and the line-of-sight of the user at the time of manipulating the object.

CITATION LIST

Patent Document

Patent Document 1: Japanese Patent Application Laid-Open No. 2015-153302
Patent Document 2: International Publication No. 2016/139850

SUMMARY OF THE INVENTION

Problems to be Solved by the Invention

However, it is desirable that the situation in which the calibration of the line-of-sight can be executed be not very limited. Accordingly, it is desirable to provide a technology capable of enabling the calibration of the line-of-sight to be executed more naturally.

Solutions to Problems

According to the present disclosure, provided is an information processing apparatus including: a line-of-sight information acquisition unit configured to acquire line-of-sight information of a user; and a calibration execution unit configured to execute calibration on the basis of a position of a target object in a visual field and the line-of-sight information, the target object having a visual attraction degree higher than a first threshold and a size in a predetermined direction smaller than a predetermined size, in a case where the target object has been detected from the visual field of the user.

According to the present disclosure, provided is an information processing method including: acquiring line-of-sight information of a user; and executing calibration by a processor on the basis of a position of a target object in a visual field and the line-of-sight information, the target object having a visual attraction degree higher than a first threshold and a size in a predetermined direction smaller than a predetermined size, in a case where the target object has been detected from the visual field of the user.

According to the present disclosure, provided is a program for causing a computer to function as an information processing apparatus, the information processing apparatus including:
a line-of-sight information acquisition unit configured to acquire line-of-sight information of a user; and a calibration execution unit configured to execute calibration on the basis of a position of a target object in a visual field and the line-of-sight information, the target object having a visual attraction degree higher than a first threshold and a size in a predetermined direction smaller than a predetermined size, in a case where the target object has been detected from the visual field of the user.

Effects of the Invention

As described above, according to the present disclosure, provided is a technology capable of enabling the calibration of the line-of-sight to be executed more naturally. Note that the above-described effects are not necessarily limited, and any one of the effects shown in this specification or other effects grasped from this specification may be exerted together with the above-described effects or instead of the above-described effects.

BRIEF DESCRIPTION OF THE DRAWINGS

FIG. 1 is a diagram showing a configuration example of an information processing system according to a first embodiment.

MODE FOR CARRYING OUT THE INVENTION

Figure 2:
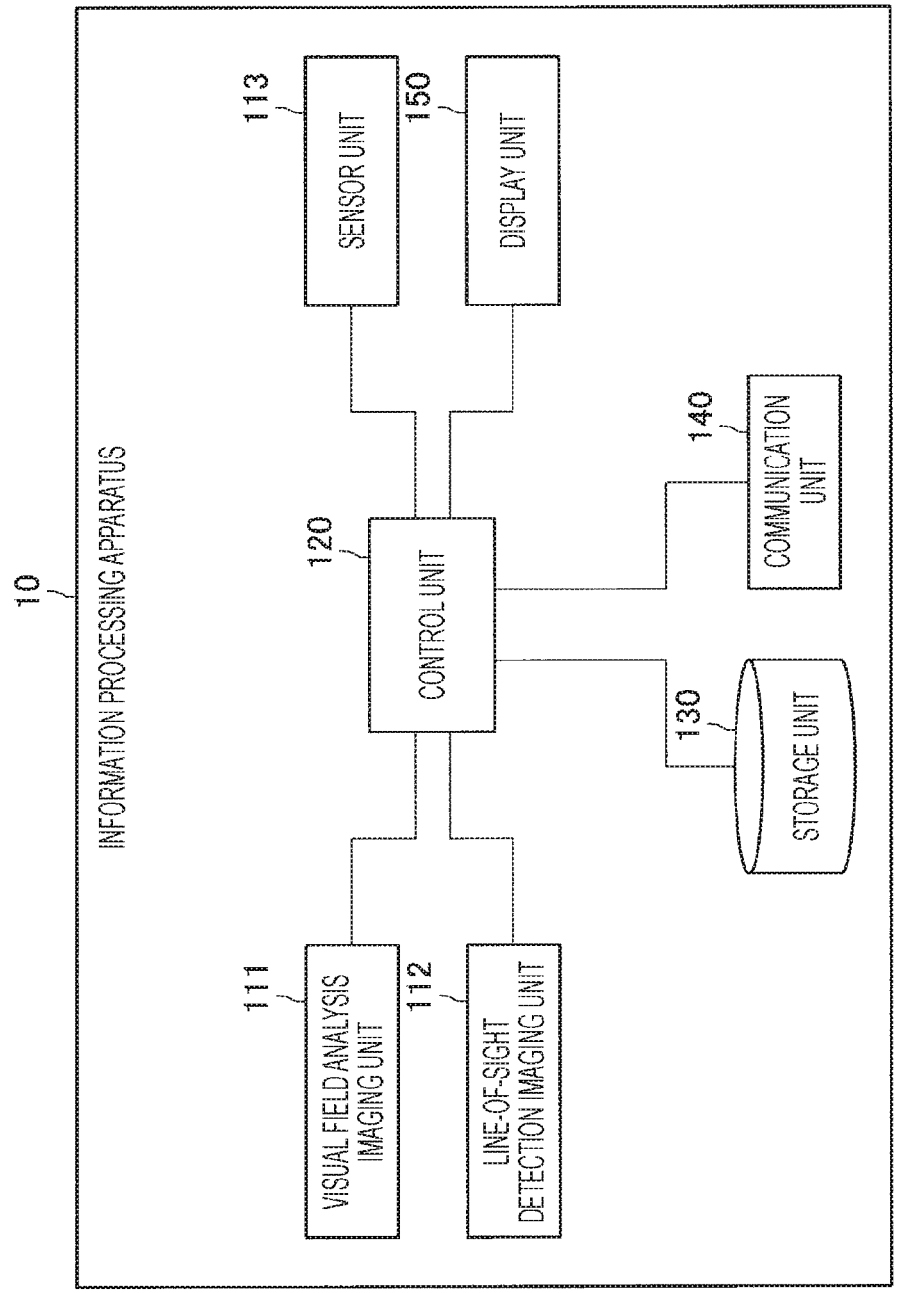
FIG. 2 is a diagram showing a functional configuration example of the information processing apparatus.

Hereinafter, preferred embodiments of the present disclosure will be described in detail with reference to the accompanying drawings. Note that, in this specification and the drawings, constituent elements having substantially the same functional configurations are denoted by the same reference signs to omit redundant description.

Moreover, in this specification and the drawings, there may be a case where a plurality of constituent elements having substantially the same or similar functional configurations is distinguished by adding different figures after the same reference signs. However, in a case where it is not necessary to particularly distinguish each of the plurality of constituent elements having substantially the same or similar functional configurations, only the same reference signs are used. Furthermore, there may be case where similar constituent elements in different embodiments are distinguished by adding different alphabets after the same reference signs. However, in a case where it is not necessary to particularly distinguish each of the similar constituent elements, only the same reference signs are used.

Note that the description will be given in the following order.

0. Overview
1. Details of Embodiments
1.1 System Configuration Example
1.2. Functional Configuration Example of Information Processing Apparatus
1.3. Function Details of Information Processing System
1.3.1. Details of Calibration
1.3.2. Recalibration
1.3.3. Various Modification Examples
2. Hardware Configuration Example
3. Conclusion

0. Overview

First, the overview of the embodiments of the present disclosure will be described. In recent years, a technology of executing processing according to the line-of-sight of a user has been developed. However, an eye structure is usually different among users. For example, the users usually have different sizes of eyeballs. Furthermore, the positional relationship between the eyes of the user and a device can vary depending on differences in the devices used by the users. Therefore, there is a possibility that an error occurs in the detection of the line-of-sight of the user, and a technology for improving the accuracy of the detection of the line-of-sight of the user has also been developed.

For example, a technology of performing calibration of the line-of-sight before the detection of the line-of-sight of the user has been developed. For example, there is a technology of executing the calibration on the basis of the line-of-sight of the user and a set position of an image utilized to determine whether or not to unlock. Furthermore, there is a technology of executing the calibration on the basis of a position of an object manipulatable by a user and the line-of-sight of the user at the time of manipulating the object.

However, it is desirable that the situation in which the calibration of the line-of-sight can be executed be not very limited. For example, if the calibration of the line-of-sight cannot be executed unless a specific image is displayed (or unless a manipulatable object exists in the visual field of the user), the situation in which the calibration of the line-of-sight can be executed is limited. Accordingly, in this specification, a technology capable of enabling the calibration of the line-of-sight to be executed more naturally will be mainly described.

The overview of the embodiments of the present disclosure has been described above.

1. Details of Embodiments

First, the details of the embodiments of the present disclosure will be described.

1.1. System Configuration Example

First, a configuration example of an information processing system according to the embodiments of the present disclosure will be described with reference to the drawings. FIG. 1 is a diagram showing a configuration example of the information processing system according to the embodiments of the present disclosure. As shown in FIG. 1, the information processing system according to the embodiments of the present disclosure includes an information processing apparatus 10. The information processing apparatus 10 is used by a user U1.

Note that a case where the information processing apparatus 10 is a head mounted display (HMD) worn on the head of the user U1 will be mainly described in the present embodiment. In particular, in the present embodiment, a case where the information processing apparatus 10 is a see-through HMD will be mainly described. However, the information processing apparatus 10 is not limited to the HMD. For example, the information processing apparatus 10 may be a smartphone or may be a tablet terminal.

In the example shown in FIG. 1, the user U1 wearing the information processing apparatus 10 on the head is looking out of a window M1 from a room. A real space R1 exists outside the window M1, and the user U1 can visually recognize the real space R1 through the information processing apparatus 10 (the visual field of the user U1 includes the real space R1). Herein, any object may exist in the real space R1. In the present embodiment, the line-of-sight of the user U1 to an object existing in the real space R1 is utilized for the calibration. Hereinafter, mainly presumed is a case where buildings B1 to B3 exist as an example of one or a plurality of objects in the real space R1.

The configuration example of the information processing system according to the embodiments of the present disclosure has been described above.

1.2. Functional Configuration Example of Information Processing Apparatus

Next, a functional configuration example of the information processing apparatus 10 will be described. FIG. 2 is a diagram showing the functional configuration example of the information processing apparatus 10. As shown in FIG. 2, the information processing apparatus 10 has a visual field analysis imaging unit iii, a line-of-sight detection imaging unit 112, a sensor unit 113, a control unit 120, a storage unit 130, a communication unit 140 and a display unit 150. Furthermore, the information processing apparatus 10 may be connected to a server apparatus (not shown) via a communication network. The communication network includes, for example, the Internet.

The visual field analysis imaging unit 111 has a function of obtaining an image (visual field analysis image) by imaging the visual field of the user U1. For example, the visual field analysis imaging unit 111 includes a camera (including an image sensor) and obtains the visual field analysis image captured by the camera. The number of cameras included in the visual field analysis imaging unit 111 is not particularly limited as long as the number is one or more. Then, the position at which the visual field analysis imaging unit 111 is provided is not particularly limited either. For example, the visual field analysis imaging unit 111 may be integrated with the information processing apparatus 10 or may exist as an entity separated from the information processing apparatus 10.

The line-of-sight detection imaging unit 112 has a function of obtaining an image (line-of-sight detection image) by imaging the eyes of the user U1. For example, the line-of-sight detection imaging unit 112 includes a camera (including an image sensor) and obtains the line-of-sight detection image captured by the camera. The number of cameras included in the line-of-sight detection imaging unit 112 is not particularly limited as long as the number is one or more. Then, the position at which the line-of-sight detection imaging unit 112 is provided is not particularly limited either. For example, the line-of-sight detection imaging unit 112 may be integrated with the information processing apparatus 10 or may exist as an entity separated from the information processing apparatus 10.

The sensor unit 113 is constituted by including a sensor and has a function of detecting the visual field motion of the user U1. For example, the sensor unit 113 may be constituted by including an acceleration sensor and detect the visual field motion of the user U1 by the acceleration detected by the acceleration sensor. Alternatively, the sensor unit 113 may be constituted by including a gyro sensor and detect the visual field motion of the user U1 by the angular velocity detected by the gyro sensor. Note that the sensor unit 113 does not have to be provided in a case where the visual field motion of the user U1 is detected on the basis of the visual field analysis image captured by the visual field analysis imaging unit 111.

The communication unit 140 is constituted by including a communication circuit and has functions of acquiring data from a server apparatus (not shown) connected to the communication network and providing data to the server apparatus (not shown) via the communication network. For example, the communication unit 140 is constituted by a communication interface. Note that the number of server apparatuses (not shown) connected to the communication network may be one or may be plural.

The storage unit 130 is constituted by including a memory and is a recording medium that stores a program executed by the control unit 120 and stores data necessary for the execution of the program. Furthermore, the storage unit 130 temporarily stores data for arithmetic operations by the control unit 120. The storage unit 130 is constituted by a magnetic storage unit device, a semiconductor storage device, an optical storage device, a magneto-optical storage device, or the like.

The display unit 150 has a function of displaying various screens. The type of the display unit 150 is not limited. For example, the display unit 150 only needs to be a display capable of performing visually recognizable display to the user and may be a liquid crystal display or may be an organic electro-luminescence (EL) display.

Figure 3:
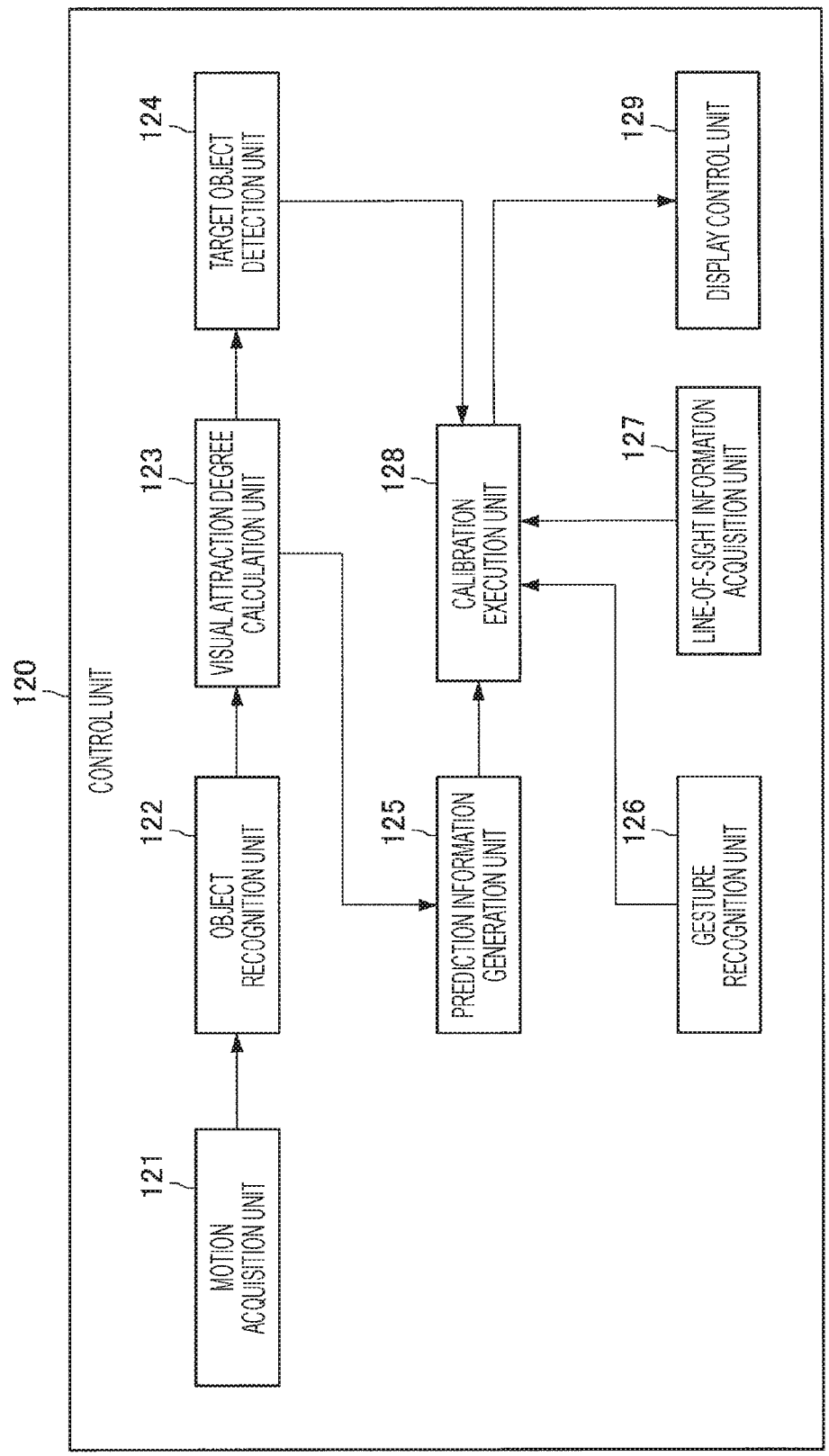
FIG. 3 is a diagram showing a detailed configuration example of the control unit.

The control unit 120 executes control of each unit of the information processing apparatus 10. FIG. 3 is a diagram showing a detailed configuration example of the control unit 120. As shown in FIG. 3, the control unit 120 includes a motion acquisition unit 121, an object recognition unit 122, a visual attraction degree calculation unit 123, a target object detection unit 124, a prediction information generation unit 125, a gesture recognition unit 126, a line-of-sight information acquisition unit 127, a calibration execution unit 128 and a display control unit 129. The detail of each of these functional blocks will be described later. Note that the control unit 120 may be constituted by, for example, one or a plurality of central processing units (CPU). In a case where the control unit 120 is constituted by a processing unit such as a CPU, the processing apparatus may be constituted by an electronic circuit.

The functional configuration example of the information processing apparatus 10 according to the present embodiment has been described above.

1.3. Function Details of Information Processing System

Next, the function details of the information processing system according to the present embodiment will be described.

1.3.1. Details of Calibration

Figure 4:
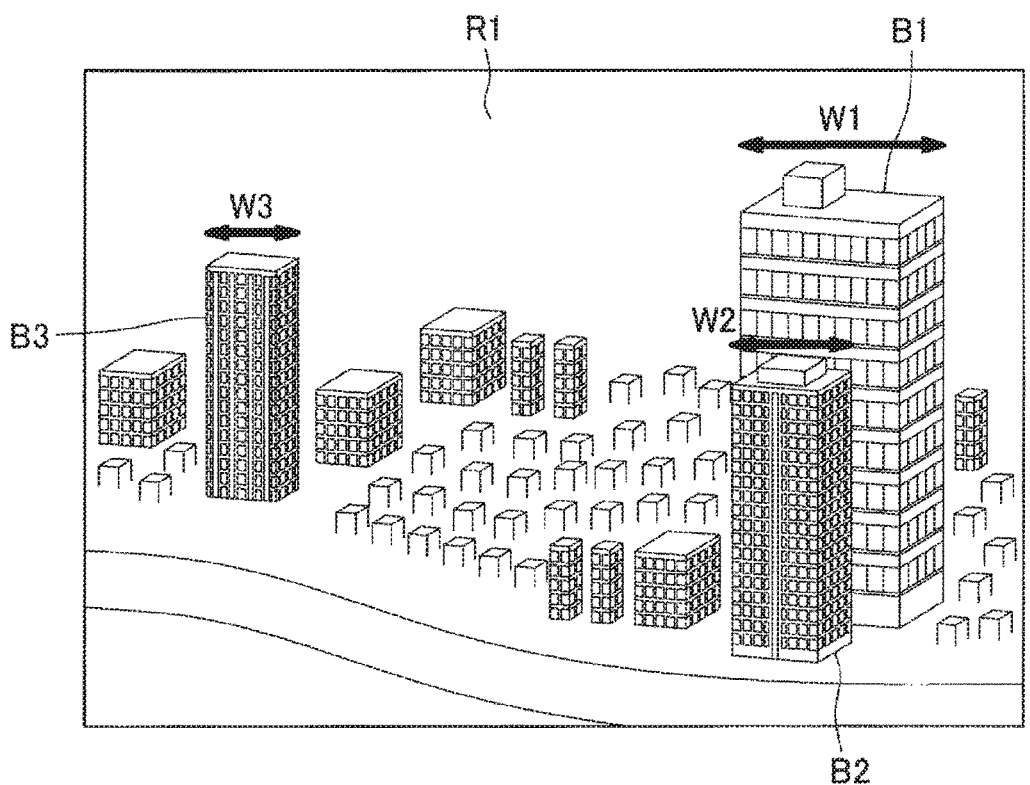
FIG. 4 is a diagram showing an example of the visual field of the user.

FIG. 4 is a diagram showing an example of the visual field of the user. Note that the information processing apparatus 10 worn on the head of the user is omitted in FIG. 4. As shown in FIG. 4, in the visual field of the user, the buildings B1 to B3 exist as an example of one or a plurality of objects existing in the real space R1.

Herein, among the one or plurality of objects existing in the visual field of the user U1, it is considered that the line-of-sight of the user U1 is highly likely to meet an object with a visual attraction degree higher than a certain threshold (first threshold). In the present embodiment, the calibration is executed by utilizing the fact that the line-of-sight of the user U1 is highly likely to meet the object with a visual attraction degree higher than the first threshold. In the example shown in FIG. 4, suppose that the visual attraction degrees of the buildings B1 to B3 are higher than the first threshold.

Moreover, among the objects with visual attraction degrees higher than the first threshold, it is considered that an error, in a predetermined direction, of the position that the line-of-sight meets is smaller and the accuracy of the calibration is improved, in a case where the line-of-sight meets an object with a size in the predetermined direction smaller than a predetermined size as compared to a case where the line-of-sight meets an object with a size in the predetermined direction larger than the predetermined size. Accordingly, in the present embodiment, the calibration is executed by utilizing the line-of-sight of the user U1 toward an object with a size in the predetermined direction smaller than the predetermined size.

Note that the predetermined direction may be a horizontal direction, may be a vertical direction or may be another direction. Referring to FIG. 4, the sizes of the buildings B1 to B3 in the horizontal direction are denoted by W1 to W3, respectively. For example, in the example shown in FIG. 4, suppose that the size W1 of the building B1 in the horizontal direction is larger than the predetermined size. On the other hand, suppose that the size W2 of the building B2 in the horizontal direction is smaller than the predetermined size, and the size W3 of the building B3 in the horizontal direction is smaller than the predetermined size.

Hereinafter, the details of the calibration according to the present embodiment will be described. Herein, the timing when the calibration is executed is not limited. For example, the calibration may be executed at the timing when the information processing apparatus 10 is activated, may be executed at predetermined time intervals, or may be executed in a case where the user has manipulated for the instruction that the calibration is to be executed. However, it is considered that the accuracy of the calibration is higher if the calibration is executed in a case where the visual field motion of the user is less.

Accordingly, in the present embodiment, the motion acquisition unit 121 acquires the visual field motion of the user. For example, as described above, the motion acquisition unit 121 acquires the motion detected by the sensor unit 113. Then, the object recognition unit 122 determines whether or not the visual field motion of the user acquired by the motion acquisition unit 121 is less than predetermined motion. The object recognition unit 122 recognizes one or a plurality of objects from the visual field of the user in a case where the visual field motion of the user acquired by the motion acquisition unit 121 is less than the predetermined motion.

Specifically, in a case where the visual field motion of the user acquired by the motion acquisition unit 121 is less than the predetermined motion, the object recognition unit 122 recognizes one or a plurality of objects from the visual field analysis image captured by the visual field analysis imaging unit 111. Note that the motion acquisition unit 121 does not have to acquire the visual field motion of the user, and the object recognition unit 122 does not have to determine whether or not the visual field motion of the user is less than the predetermined motion. Herein, presumed is a case where the object recognition unit 122 recognizes a group of objects (including the buildings B1 to B3) existing in the visual field of the user.

On the basis of the visual field analysis image captured by the visual field analysis imaging unit 111, the visual attraction degree calculation unit 123 calculates the visual attraction degrees of the group of the objects (including the buildings B1 to B3) recognized by the object recognition unit 122. Herein, the visual attraction degree may be a numerical value indicating how much the visual attention of the user U1 is paid. How the visual attraction degree is specifically calculated is not limited. For example, the technique of calculating the visual attraction degree disclosed in Japanese Patent Application Laid-Open No. 2014-170396 may be applied to the technique of calculating the visual attraction degree by the visual attraction degree calculation unit 123 according to the present embodiment.

The target object detection unit 124 detects, from the visual field of the user, a target object which has a visual attraction degree higher than the first threshold and a size in the predetermined direction smaller than the predetermined size. More specifically, the target object detection unit 124 detects, from the group of the objects (including the buildings B1 to B3) recognized by the object recognition unit 122, a target object which has a visual attraction degree higher than the first threshold and a size in the predetermined direction smaller than the predetermined size. At this time, all objects, which have visual attraction degrees higher than the first threshold and sizes in the predetermined direction smaller than the predetermined size, may be detected as the target objects. However, some of the objects, which have visual attraction degrees higher than the first threshold and sizes in the predetermined direction smaller than the predetermined size, do not have to be detected as the target objects.

For example, also presumed is a case where, among the group of the objects recognized by the object recognition unit 122, another object, which has a visual attraction degree higher than a second threshold, is located at a distance from one object shorter than a predetermined distance. In such a case, it is considered that determining whether the object that the line-of-sight of the user meets is the one object or another object is difficult and the accuracy of the calibration is not improved. Accordingly, in a case where another object, which has a visual attraction degree higher than the second threshold, is located at a distance from the one object shorter than the predetermined distance, the target object detection unit 124 is only required not to detect the one object as the target object.

In the example shown in FIG. 4, the target object detection unit 124 detects the buildings B1 to B3 as objects having visual attraction degrees higher than the first threshold. Furthermore, in the example shown in FIG. 4, presumed is a case where the predetermined direction is the horizontal direction, and the target object detection unit 124 detects, from the buildings B1 to B3 having visual attraction degrees higher than the first threshold, the building B2 and the building B3 as the objects with the sizes in the horizontal direction smaller than the predetermined size.

However, in the example shown in FIG. 4, presumed is a case where the target object detection unit 124 determines that the building B1 has a visual attraction degree higher than the second threshold and that the building B1 is located at a distance from the building B2 shorter than the predetermined distance, and does not detect the building B2 as the target object (presumed is a case where the building B3 is detected as the target object).

The line-of-sight information acquisition unit 127 acquires the user line-of-sight information. More specifically, the line-of-sight information acquisition unit 127 acquires the line-of-sight information indicating the line-of-sight of the user by analyzing the line-of-sight detection image detected by the line-of-sight detection imaging unit 112. In a case where the target object has been detected by the target object detection unit 124, the calibration execution unit 128 executes the calibration on the basis of the position of the target object in the visual field of the user and the line-of-sight information acquired by the line-of-sight information acquisition unit 127. This makes it possible to enable the calibration of the line-of-sight to be executed more naturally.

At this time, in a case where a target object with a size in the predetermined direction smaller than the predetermined size has been detected, an error in the predetermined direction of the position that the line-of-sight meets is considered to be small, and the accuracy of the calibration in the predetermined direction is considered to be improved.

Accordingly, in such a case, the calibration execution unit 128 is only required to execute the calibration for a direction substantially parallel to the predetermined direction (e.g., for the predetermined direction).

For example, in a case where a target object with a size in the horizontal direction smaller than the predetermined size has been detected, the calibration execution unit 128 may execute the calibration for a direction substantially parallel to the horizontal direction (e.g., for the horizontal direction). Alternatively, in a case where a target object with a size in the vertical direction smaller than the predetermined size has been detected, the calibration execution unit 128 may execute the calibration for a direction substantially parallel to the vertical direction (e.g., for the vertical direction). However, the calibration execution unit 128 may execute the calibration regardless of the predetermined direction.

Note that, in a case where a target object with a size in the horizontal direction smaller than the predetermined size has been detected, the calibration execution unit 128 may execute the calibration without any particular condition, but may also execute the calibration in a case where a predetermined condition is met. For example, in a case where a target object with a size in the horizontal direction smaller than the predetermined size has been detected, the calibration execution unit 128 may control whether or not to execute the calibration on the basis of line-of-sight motion prediction information of the user generated by the prediction information generation unit 125. Such an example will be described with reference to FIGS. 5 and 6.

Figure 5:
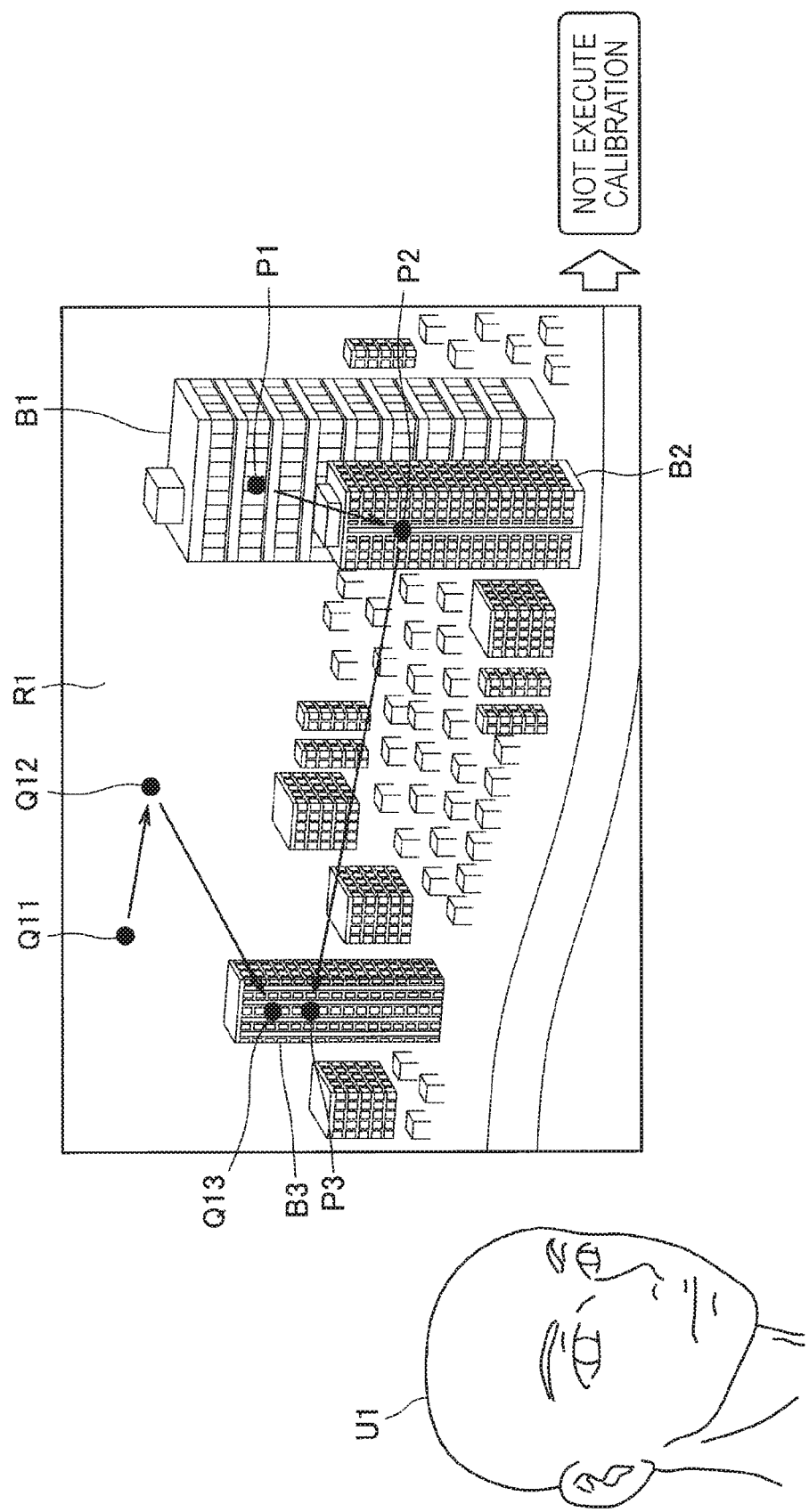
FIG. 5 is a diagram for describing a case of determining that the calibration is not to be executed on the basis of the line-of-sight motion prediction information.

FIG. 5 is a diagram for describing a case of determining that the calibration is not to be executed on the basis of the line-of-sight motion prediction information. Prior to determining whether or not to execute the calibration, the prediction information generation unit 125 generates the line-of-sight motion prediction information of the user on the basis of the visual attraction degrees of the group of the objects calculated by the visual attraction degree calculation unit 123. The line-of-sight motion prediction information of the user is information indicating the result of predicting order of the line-of-sight motion of the user on the basis of the visual attraction degrees.

First, the prediction information generation unit 125 detects, from the visual field of the user, a plurality of objects having visual attraction degrees higher than a third threshold. Specifically, on the basis of the visual attraction degrees of the group of the objects calculated by the visual attraction degree calculation unit 123, the prediction information generation unit 125 detects a plurality of objects having visual attraction degrees higher than the third threshold. Then, the prediction information generation unit 125 generates, as the line-of-sight motion prediction information, information in which the respective positions of the plurality of detected objects are arranged in descending order of the visual attraction degrees.

In the example shown in FIG. 5, suppose that the buildings B1 to B3 have visual attraction degrees higher than the third threshold, and among the buildings B1 to B3, the visual attraction degree of the building B1 is the highest, the visual attraction degree of the building B2 is the second highest, and the visual attraction degree of the building B3 is the lowest. At this time, the prediction information generation unit 125 determines that the buildings B1 to B3 have visual attraction degrees higher than the third threshold and the visual attraction degrees are in descending order of the buildings B1, the building B2 and the building B3, and generates, as the line-of-sight motion prediction information, the information in which a position P1 of the building B1, a position P2 of the building B2, and a position P3 of the building B3 are arranged in this order.

Then, the calibration execution unit 128 acquires, as actual line-of-sight motion measurement information, the information in which the positions that the line-of-sight of the user U1 has actually met are arranged in chronological order. More specifically, the calibration execution unit 128 acquires the line-of-sight information acquired in chronological order by the line-of-sight information acquisition unit 127 and acquires, as the actual line-of-sight motion measurement information, the information in which these pieces of line-of-sight information are arranged in the acquisition order. Note that the positions that the line-of-sight has met may be the same positions in a case where the line-of-sight has been meeting the same positions over a predetermined period of time.

In the example shown in FIG. 5, the positions that the line-of-sight of the user U1 meets are not in the descending order of the visual attraction degrees, and the line-of-sight of the user U1 meets a position Q11, a position Q12 and a position Q13 in chronological order. In other words, the line-of-sight information indicating each of the position Q11, the position Q12 and the position Q13 is acquired by the line-of-sight information acquisition unit 127 in chronological order, and the calibration execution unit 128 acquires, as the actual line-of-sight motion measurement information, the information in which these pieces of line-of-sight information are arranged in the acquisition order.

Then, in a case where a matching degree between the line-of-sight motion prediction information and the actual line-of-sight motion measurement information does not exceed a predetermined reference value, it is considered that the user U1 moves the line-of-sight on the basis of a criterion different from the visual attraction degree. Thus, the calibration execution unit 128 does not have to execute the calibration in this case. Herein, the matching degree may be calculated in any way. As one example, the calibration execution unit 128 may calculate the matching degree between the line-of-sight motion prediction information and the actual line-of-sight motion measurement information to be smaller as the sum (or the average value) of the distances (or the squares of the distances) between the positions with corresponding orders in the line-of-sight motion prediction information and the actual line-of-sight motion measurement information is greater.

For example, in the example shown in FIG. 5, in the line-of-sight motion prediction information and the actual line-of-sight motion measurement information, the orders of the positions P1 and Q11 correspond to each other, the orders of the positions P2 and Q12 correspond to each other, and the orders of the positions P3 and Q13 correspond to each other. Therefore, the calibration execution unit 128 may calculate the matching degree between the line-of-sight motion prediction information and the actual line-of-sight motion measurement information on the basis of the average value of the squares of the distance between the positions P1 and Q11, the distance between the positions P2 and Q12 and the distance between the positions P3 and Q13. In the example shown in FIG. 5, presumed is a case where the calibration execution unit 128 does not execute the calibration because the matching degree does not exceed the predetermined reference value.

Figure 6:
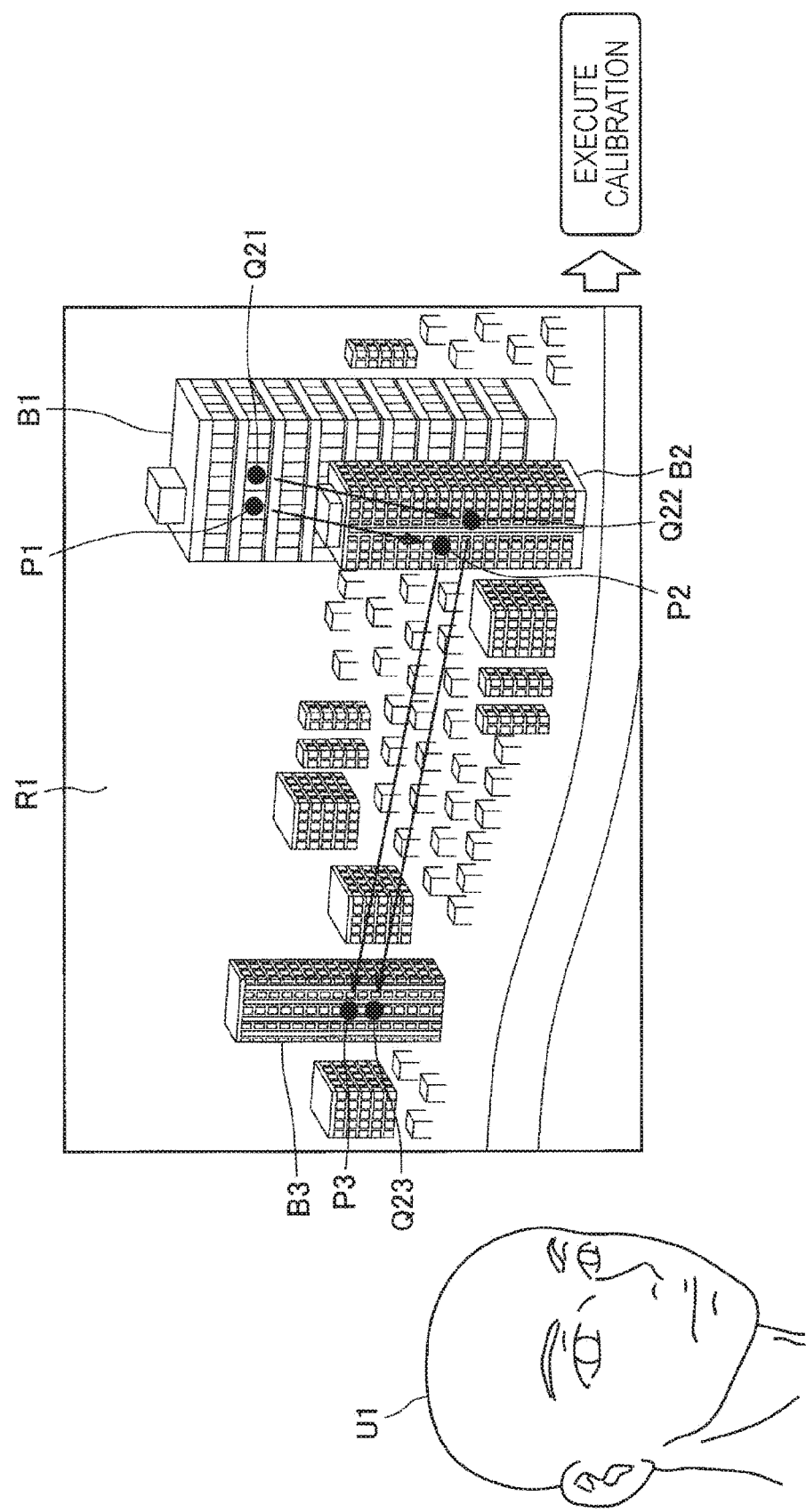
FIG. 6 is a diagram for describing a case of determining that the calibration is to be executed on the basis of the line-of-sight motion prediction information.

FIG. 6 is a diagram for describing a case of determining that the calibration is to be executed on the basis of the line-of-sight motion prediction information. Also in the example shown in FIG. 6, similar to the example shown in FIG. 5, the prediction information generation unit 125 determines that the buildings B1 to B3 have visual attraction degrees higher than the third threshold and the visual attraction degrees are in descending order of the buildings B1, the building B2 and the building B3, and generates, as the line-of-sight motion prediction information, the information in which the position P1 of the building B1, the position P2 of the building B2, and the position P3 of the building B3 are arranged in this order.

On the other hand, in the example shown in FIG. 6, the positions that the line-of-sight of the user U1 meets are not in the descending order of the visual attraction degrees, and the line-of-sight of the user U1 meets a position Q21, a position Q22 and a position Q23 in chronological order. In other words, the line-of-sight information indicating each of the position Q21, the position Q22 and the position Q23 is acquired by the line-of-sight information acquisition unit 127 in chronological order, and the calibration execution unit 128 acquires, as the actual line-of-sight motion measurement information, the information in which these pieces of line-of-sight information are arranged in the acquisition order.

At this time, in a case where the matching degree between the line-of-sight motion prediction information and the actual line-of-sight motion measurement information exceeds the predetermined reference value, it is considered that the user U1 moves the line-of-sight in the descending order of the visual attraction degrees. Thus, the calibration execution unit 128 is only required to execute the calibration in this case.

For example, in the example shown in FIG. 6, in the line-of-sight motion prediction information and the actual line-of-sight motion measurement information, the orders of the positions P1 and Q21 correspond to each other, the orders of the positions P2 and Q22 correspond to each other, and the orders of the positions P3 and Q23 correspond to each other. Therefore, the calibration execution unit 128 may calculate the matching degree between the line-of-sight motion prediction information and the actual line-of-sight motion measurement information on the basis of the average value of the squares of the distance between the positions P1 and Q21, the distance between the positions P2 and Q22 and the distance between the positions P3 and Q23. In the example shown in FIG. 6, presumed is a case where the calibration execution unit 128 executes the calibration because the matching degree exceeds the predetermined reference value. Note that, herein, the matching degree between the line-of-sight motion prediction information and the actual line-of-sight motion measurement information may be calculated by other techniques. For example, the matching degree between the line-of-sight motion prediction information and the actual line-of-sight motion measurement information may be calculated by a matching degree between the respective directions (vectors) of the line-of-sight motion prediction information and the actual line-of-sight motion measurement information.

In a case where the calibration has been executed in this manner and the execution of the calibration has been completed, the user U1 should be aware of the completion of the execution of the calibration. Accordingly, in a case where the calibration execution unit 128 has completed the execution of the calibration, the display control unit 129 should control the display unit 150 such that the information indicating the completion of the calibration execution is displayed by the display unit 150.

Figure 7:
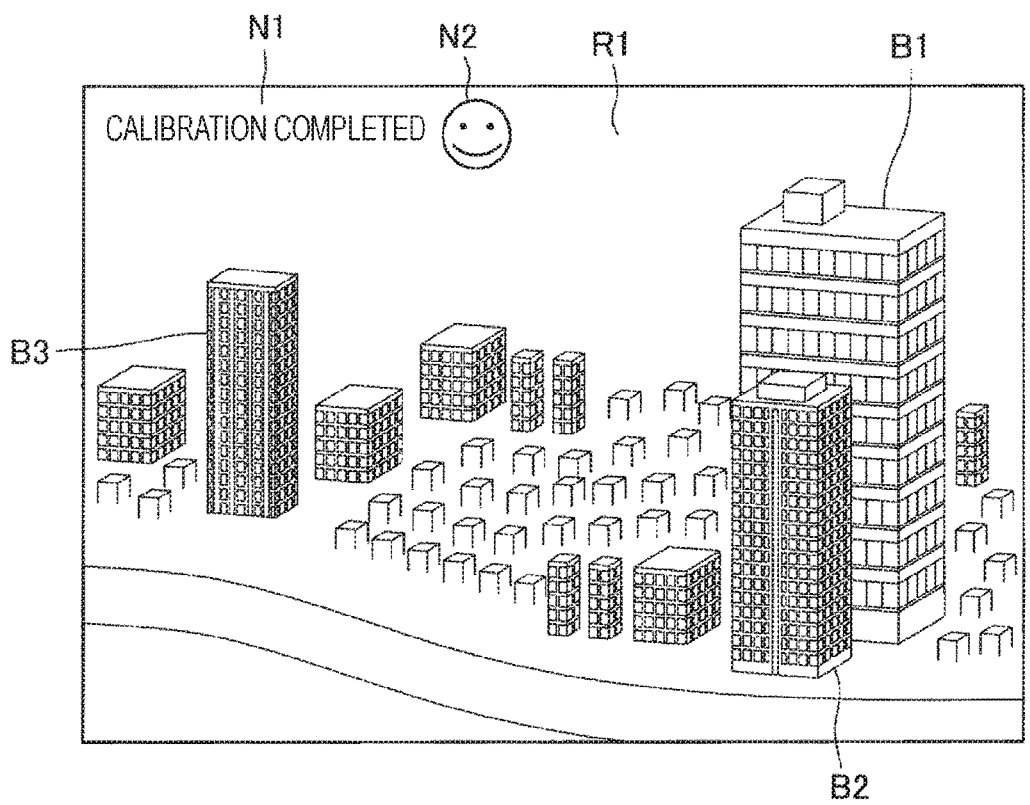
FIG. 7 is a diagram showing an example of displayed information indicating the completion of the calibration execution.

FIG. 7 is a diagram showing an example of the displayed information indicating the completion of the calibration execution. As shown in FIG. 7, in a case where the calibration execution unit 128 has completed the execution of the calibration, the display control unit 129 may control display of text data N1 "calibration completed" and an image N2 indicating the completion of the calibration execution as an example of information indicating the completion of the calibration execution. Note that, although the display of both the text data N1 and the image N2 is controlled in the example shown in FIG. 7, the display of any one of the text data N1 or the image N2 may be controlled.

Figure 8:
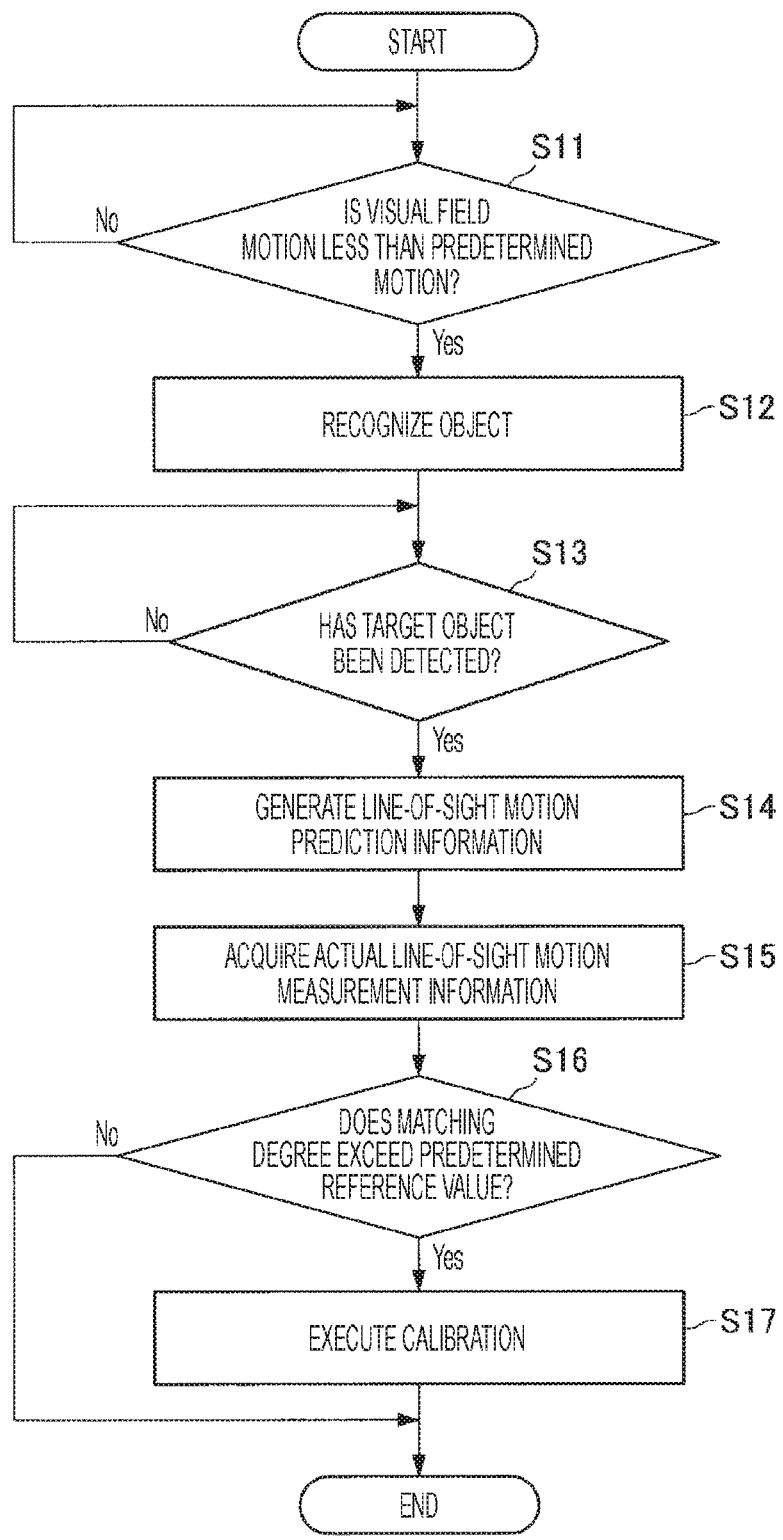
FIG. 8 is a flowchart showing an operation example of the calibration.

Next, an operation example of the calibration according to the present embodiment will be described. FIG. 8 is a flowchart showing the operation example of the calibration according to the present embodiment. As shown in FIG. 8, the motion acquisition unit 121 acquires the visual field motion of the user, and the object recognition unit 122 determines whether or not the visual field motion of the user acquired by the motion acquisition unit 121 is less than the predetermined motion (S11).

In a case where the visual field motion of the user acquired by the motion acquisition unit 121 is not less than the predetermined motion ("No" in S11), the object recognition unit 122 shifts the operation to S11. On the other hand, in a case where the visual field motion of the user acquired by the motion acquisition unit 121 is less than the predetermined motion ("Yes" in S11), the object recognition unit 122 recognizes one or a plurality of objects from the visual field of the user (S12).

Subsequently, the visual attraction degree calculation unit 123 calculates the visual attraction degrees of the group of the objects recognized by the object recognition unit 122. Then, the target object detection unit 124 attempts to detect, from the visual field of the user, a target object which has a visual attraction degree higher than the first threshold and a size in the predetermined direction smaller than the predetermined size. In a case where such a target object is not detected ("No" in S13), the target object detection unit 124 shifts the operation to S13. On the other hand, in a case where such a target object has been detected ("Yes" in S13), the target object detection unit 124 shifts the operation to S14.

Subsequently, the prediction information generation unit 125 generates the line-of-sight motion prediction information of the user on the basis of the visual attraction degrees of the group of the objects calculated by the visual attraction degree calculation unit 123 (S14). Then, the line-of-sight information acquisition unit 127 acquires the user line-of-sight information, and the calibration execution unit 128 acquires the line-of-sight information acquired in chronological order by the line-of-sight information acquisition unit 127 and acquires, as the actual line-of-sight motion measurement information, the information in which these pieces of line-of-sight information are arranged in the acquisition order (S15).

Then, in a case where the matching degree between the line-of-sight motion prediction information and the actual line-of-sight motion measurement information does not exceed the predetermined reference value ("No" in S16), it is considered that the user moves the line-of-sight on the basis of a criterion different from the visual attraction degree. Thus, the calibration execution unit 128 does not execute the calibration in this case and ends the operation. On the other hand, in a case where the matching degree between the line-of-sight motion prediction information and the actual line-of-sight motion measurement information exceeds the predetermined reference value ("Yes" in S16), it is considered that the user moves the line-of-sight in the descending order of the visual attraction degrees. Thus, the calibration execution unit 128 executes the calibration in this case (S17) and ends the operation.

The operation example of the calibration according to the present embodiment has been described above.

1.3.2. Recalibration

As described above, the calibration according to the present embodiment is executed. However, even in a case where the calibration is executed as described above, there is a possibility that a gap occurs between the detection result of the position that the line-of-sight meets and the actual position that the line-of-sight meets as time passes. For example, there is a possibility that such a gap occurs due to a way that the information processing apparatus 10 is worn on the head of the user, the physical movement of the user wearing the information processing apparatus 10, and the like.

Accordingly, even in a case where the calibration is executed as described above, the recalibration should be executed once at a certain timing. Such recalibration will be described hereinafter. Note that, in the following description, the calibration described as the recalibration does not have to be executed as the second and subsequent calibrations and may be executed as the first calibration.

Figure 9:
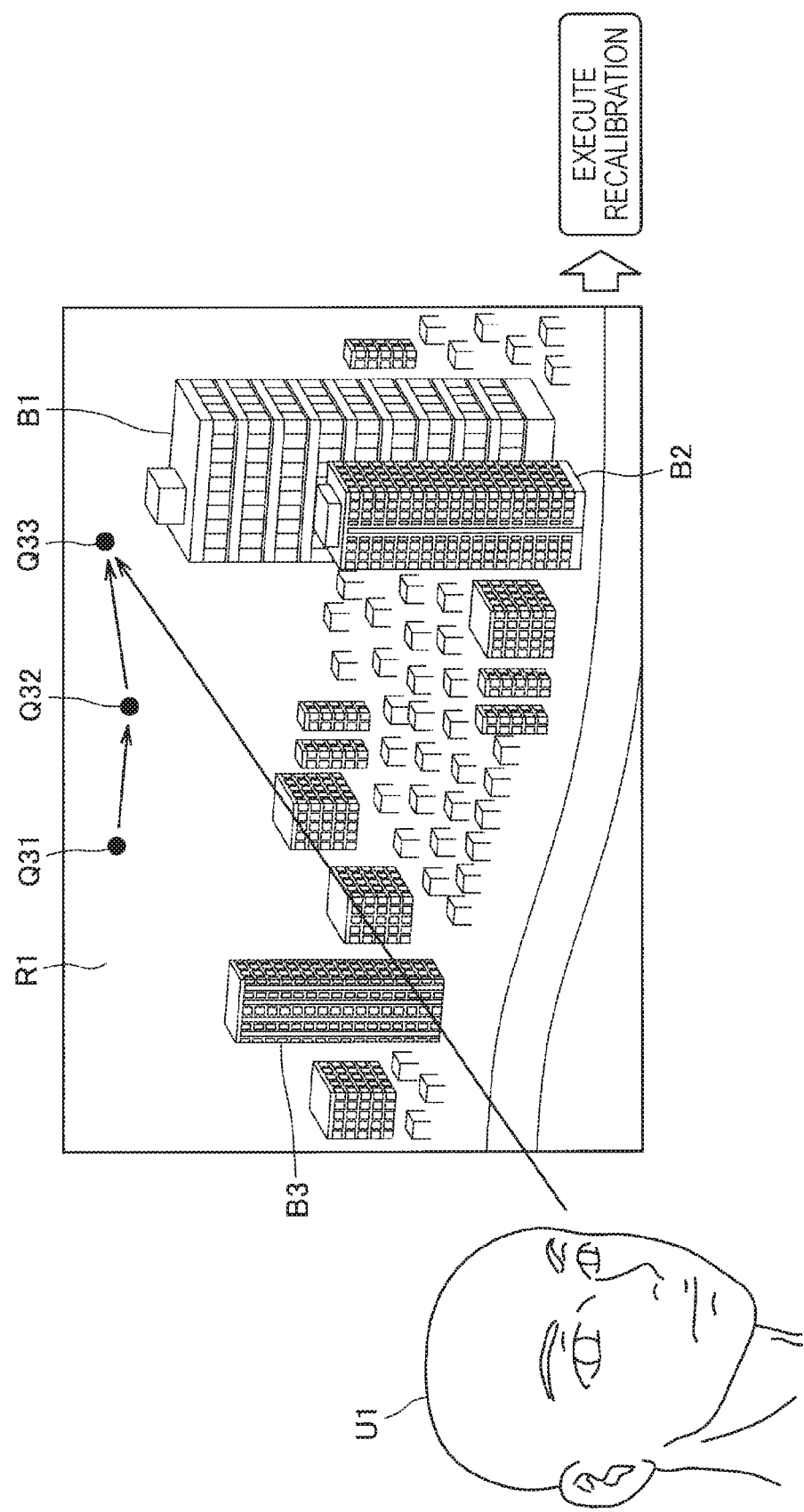
FIG. 9 is a diagram showing a first example of recalibration execution.

FIG. 9 is a diagram showing a first example of recalibration execution. Referring to FIG. 9, similar to the example shown in FIG. 5, a real space R1 exists in the visual field of a user U1, and a group of objects (including buildings B1 to B3) exists in the real space R1. Herein, similar to the example shown in FIG. 5, the visual attraction degree calculation unit 123 calculates, on the basis of the visual field analysis image captured by the visual field analysis imaging unit iii, the visual attraction degrees of the group of the objects recognized by the object recognition unit 122. Herein, it is considered that the visual attraction degree of a region where no building exists (empty region) is calculated to be low. For example, presumed is a case where the visual attraction degree calculation unit 123 calculates the visual attraction degree of the region where no building exists to be lower than a fourth threshold.

Referring to FIG. 9, the line-of-sight of the user U1 meets regions where no building exists over a predetermined period of time. More specifically, the user U1 moves the line-of-sight over a predetermined period of time in the regions where no building exists (the positions that the line-of-sight meets changes to a position Q31, a position Q32 and a position Q33 in this order). In a case where the line-of-sight goes to the regions with visual attraction degrees lower than the fourth threshold over a predetermined period of time in this way, it is considered that a gap is highly likely to occur between the detection result of the position that the line-of-sight meets and the actual position that the line-of-sight meets.

Therefore, the calibration execution unit 128 should execute the recalibration in a case where the line-of-sight goes to the regions with visual attraction degrees lower than the fourth threshold over a predetermined period of time Note that FIG. 9 has shown an example in which the recalibration is executed in a case where the user U1 has moved the line-of-sight over a predetermined period of time in the regions with the visual attraction degrees lower than the fourth threshold. However, the recalibration may also be executed in a case where the user U1 retains the line-of-sight over a predetermined period of time in a region with a visual attraction degree lower than the fourth threshold.

The example, in which the recalibration is executed in a case where the line-of-sight goes to the regions with visual attraction degrees lower than the fourth threshold over the predetermined period of time, has been described above. The timing at which the recalibration is executed is not limited to this example. For example, the calibration execution unit 128 may execute the calibration in a case where the state of the manipulation by the line-of-sight of the user is a predetermined state (e.g., in a case where the manipulation by the line-of-sight of the user is assumed to be not performed according to the desire of the user).

Herein, the manipulation by the line-of-sight of the user is not particularly limited. Hereinafter, mainly presumed is a case where the display control unit 129 controls display of a manipulation target object manipulatable by the user. The manipulation target object is not particularly limited either. Hereinafter, mainly presumed is a case where the manipulation target object is a button, but the manipulation target object may be an icon or may be text data. In such a case, presumed is a case where selection of the manipulation target object is executed in a case where the line-of-sight of the user meets the manipulation target object over a predetermined period of time.

Figure 10:
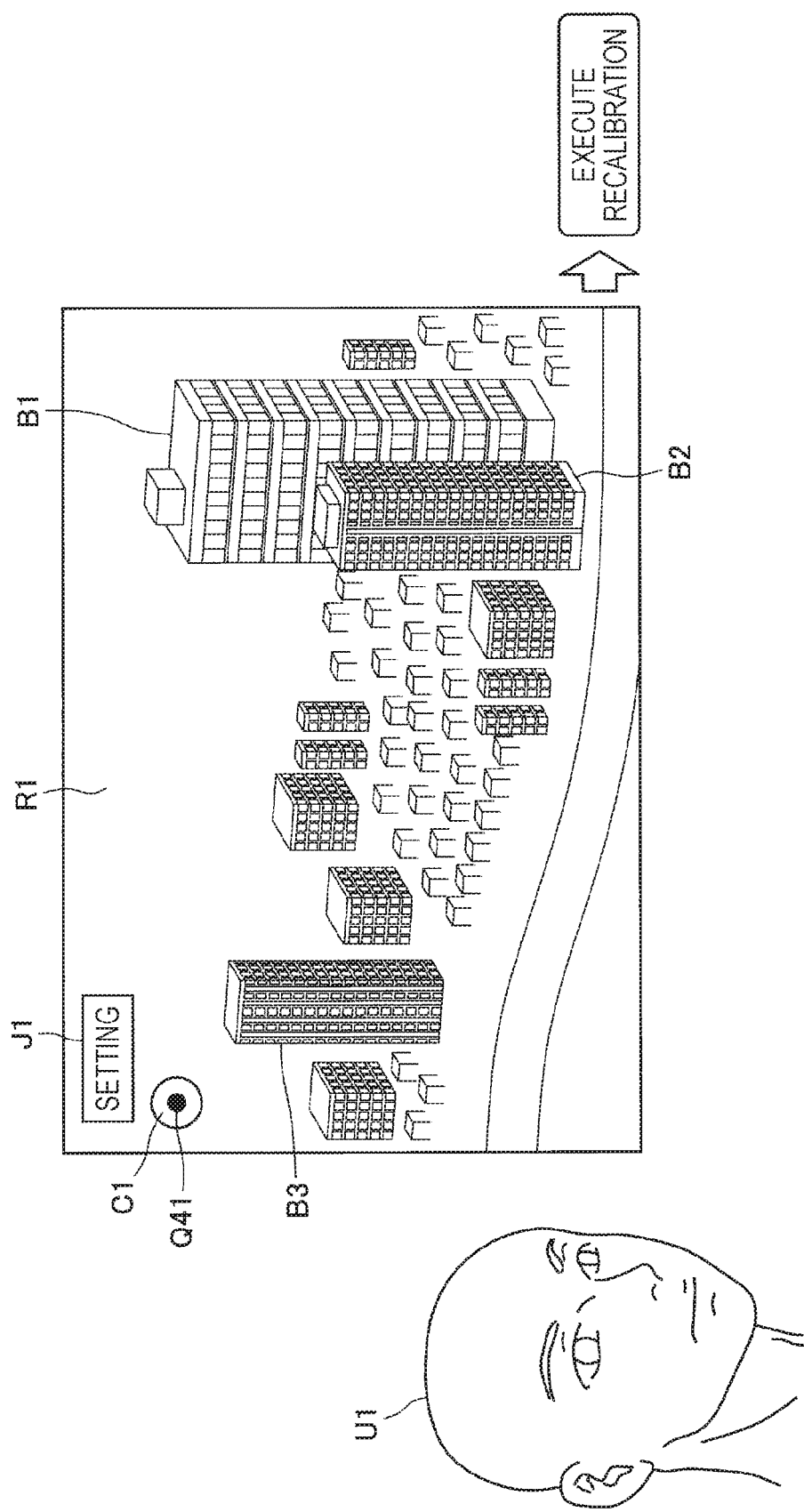
FIG. 10 is a diagram showing a second example of the recalibration execution.

FIG. 10 is a diagram showing a second example of the recalibration execution. Referring to FIG. 10, similar to the example shown in FIG. 5, a real space R1 exists in the visual field of a user U1, and a group of objects (including buildings B1 to B3) exists in the real space R1. Furthermore, referring to FIG. 10, the display control unit 129 controls the display of a manipulation target object J1. In the example shown in FIG. 10, the manipulation target object J1 is a setting button, but the manipulation target object J1 is not limited to the setting button.

Herein, referring to FIG. 10, the line-of-sight of the user U1 actually meets the manipulation target object J1 in order to select the manipulation target object J1. However, the detection result of the position that the line-of-sight of meets is a position Q41, which is different from the actual position that the line-of-sight meets (the position of the manipulation target object J1). In such a case, the calibration execution unit 128 should execute the recalibration.

More specifically, the calibration execution unit 128 should execute the recalibration in a case where selection operation based on the line-of-sight for the manipulation target object J1 is not executed although the line-of-sight of the user acquired by the line-of-sight information acquisition unit 127 meets in a predetermined range over a predetermined period of time. Herein, the predetermined range is not particularly limited. FIG. 10 shows a range C1 as the predetermined range. For example, the range C1 may be an inner region of a circle with a predetermined radius centered on the center of the locus of the detection result of the position that the line-of-sight meets.

Furthermore, the calibration once executed may be disabled in a case where a certain condition is met. For example, in a case where the user has done cancel operation, it is considered that a gap is highly likely to occur between the detection result of the position that the line-of-sight meets and the actual position that the line-of-sight meets. Accordingly, in a case where the user has done the cancel operation, the calibration execution unit 128 may disable the calibration for the target object that the line-of-sight was meeting immediately before the cancel operation. Note that the calibration to be disabled is not limited to the calibration for the target object that the line-of-sight was meeting immediately before the cancel operation. For example, in a case where the user has done the cancel operation, the calibration execution unit 128 may disable the calibration that has been performed until the cancel operation.

Figure 11:
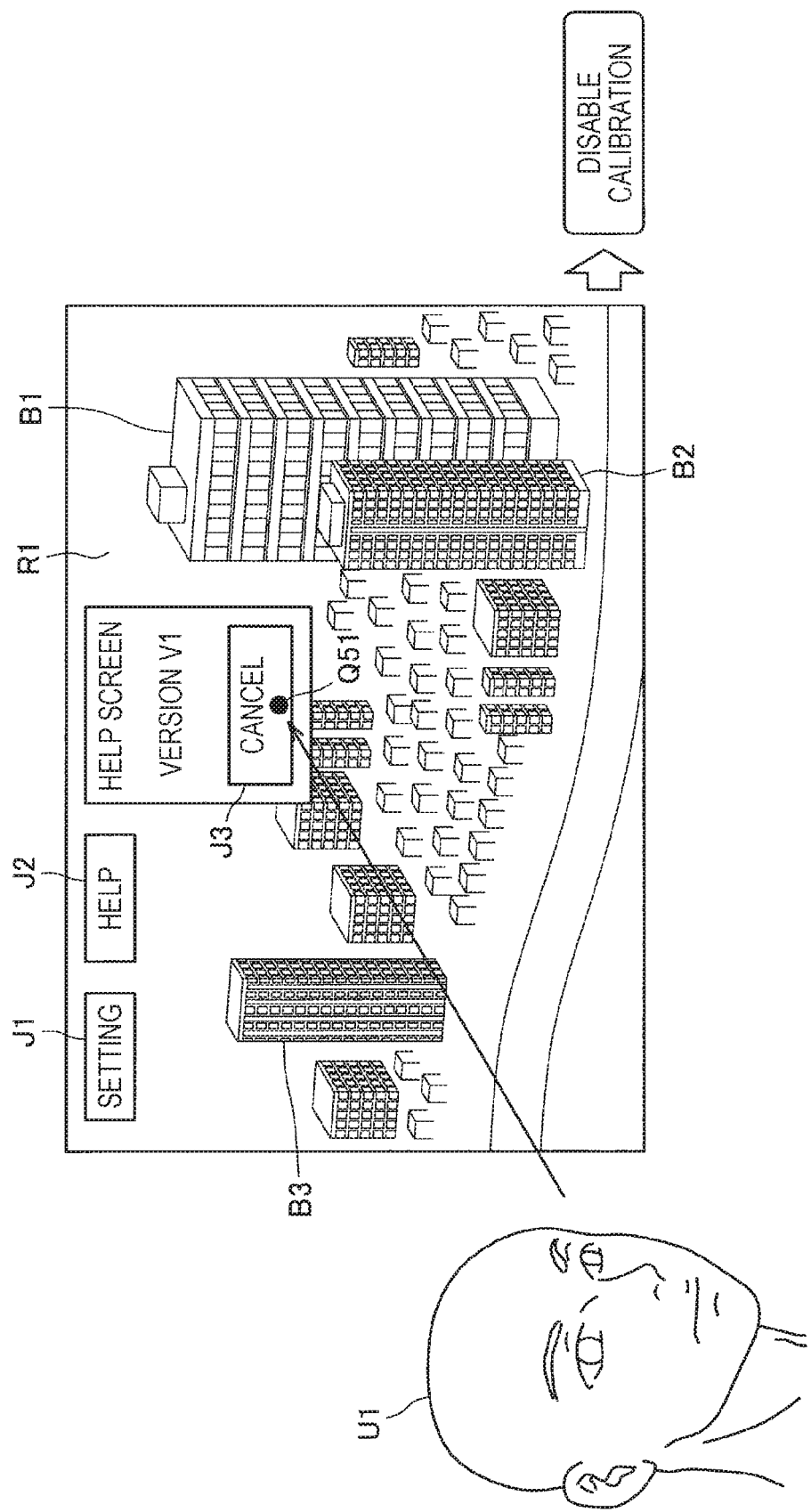
FIG. 11 is a diagram for describing an example of disabling the calibration.

FIG. 11 is a diagram for describing an example of disabling the calibration. Referring to FIG. 11, similar to the example shown in FIG. 10, a real space R1 exists in the visual field of a user U1, and a group of objects (including buildings B1 to B3) exists in the real space R1. Furthermore, referring to FIG. 11, similar to the example shown in FIG. 10, the display control unit 129 controls the display of a manipulation target object J1.

In addition, in the example shown in FIG. 11, the display control unit 129 controls the display of a manipulation target object J2. Although the manipulation target object J2 is a help button, the manipulation target object J2 is not limited to the help button.

Herein, suppose that the line-of-sight of the user U1 actually meets the manipulation target object J1 in order to select the manipulation target object J1. However, presumed is a case where the detection result of the position that the line-of-sight meets is the position of the manipulation target object J2, which is different from the actual position that the line-of-sight meets (the position of the manipulation target object J1).

In such a case, the manipulation target object J2 is erroneously selected, and the display control unit 129 controls the display of a help screen. The help screen includes a manipulation target object J3. In the example shown in FIG. 11, the manipulation target object J3 is a cancel button, but the manipulation target object J3 is not limited to the cancel button.

Thereupon, the user U1 notices that the manipulation target object J2 has been erroneously selected, and the line-of-sight meets the manipulation target object J3 as an example of the cancel operation. Note that mainly presumed herein is a case where the cancel operation is manipulation in which the line-of-sight meets the manipulation target object J3, but the cancel operation is not limited to the manipulation in which the line-of-sight meets the manipulation target object J3. For example, the cancel operation may be an instruction by a predetermined voice, may be manipulation to press down the cancel button, or may be an instruction by a predetermined gesture.

In FIG. 11, the position that the line-of-sight of the user U1 meets is indicated as a position Q51. At this time, the display control unit 129 cancels the display of the help screen, and the calibration execution unit 128 disables the calibration for the target object that the line-of-sight was meeting immediately before the cancel operation. For example, in a case where the line-of-sight was meeting the target object (building B3) immediately before the cancel operation, the calibration execution unit 128 may disable the calibration executed on the basis of the position of the target object (building B3) and the line-of-sight meeting the target object (building B3).

Figure 12:
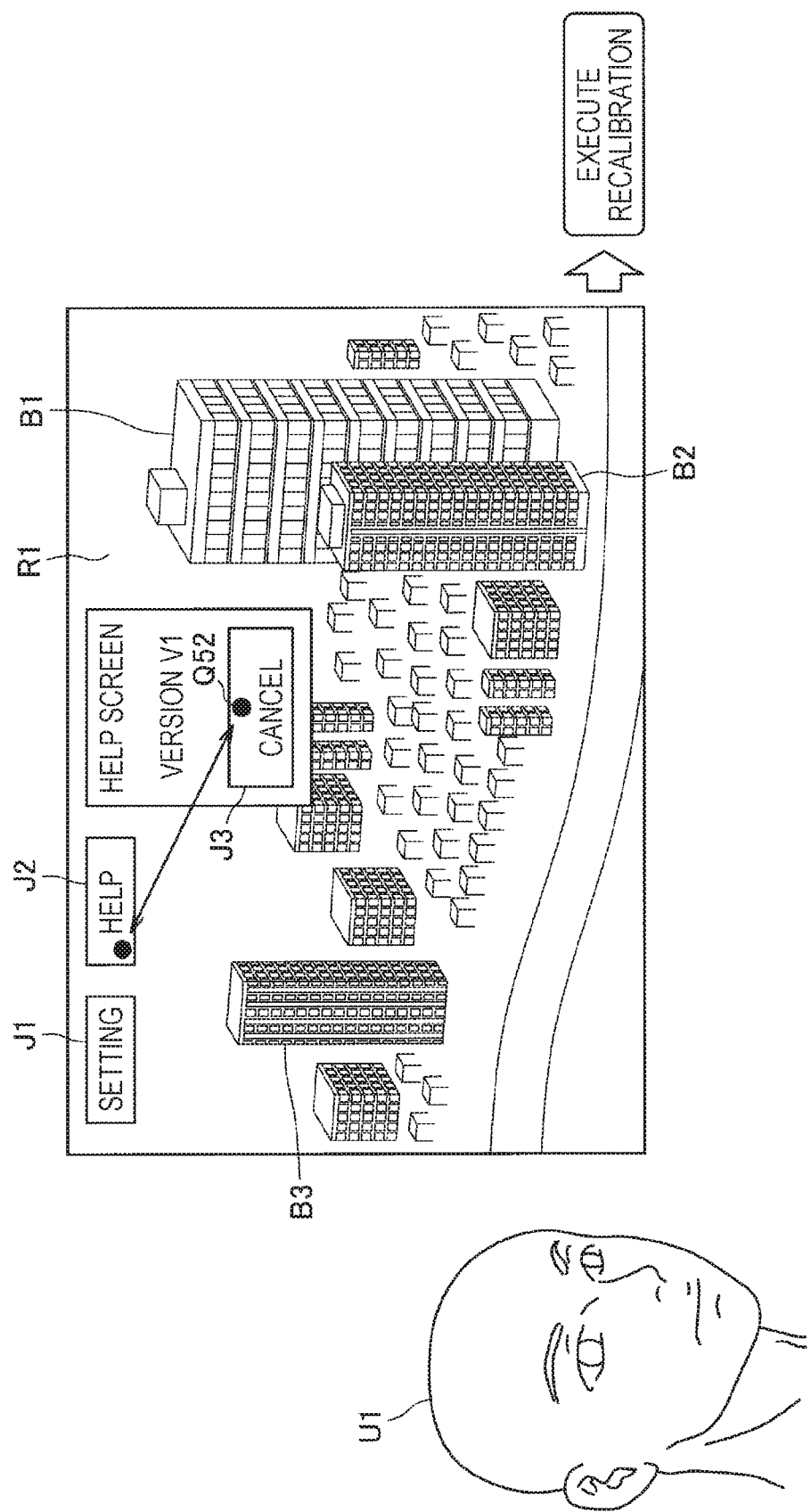
FIG. 12 is a diagram showing a third example of the recalibration execution.

FIG. 12 is a diagram showing a third example of the recalibration execution. Referring to FIG. 12, similar to the example shown in FIG. 11, a real space R1 exists in the visual field of a user U1, and a group of objects (including buildings B1 to B3) exists in the real space R1. Furthermore, referring to FIG. 12, similar to the example shown in FIG. 11, the display control unit 129 controls the display of a manipulation target object J1 and a manipulation target object J2.

Herein, suppose that the line-of-sight of the user U1 actually meets the manipulation target object J1 in order to select the manipulation target object J1. However, presumed is a case where the detection result of the position that the line-of-sight meets is the position of the manipulation target object J2, which is different from the actual position that the line-of-sight meets (the position of the manipulation target object J1).

In such a case, the manipulation target object J2 is erroneously selected, and the display control unit 129 controls the display of a help screen. The help screen includes a manipulation target object J3. In the example shown in FIG. 12, the manipulation target object J3 is a cancel button, but the manipulation target object J3 is not limited to the cancel button.

Thereupon, the user U1 notices that the manipulation target object J2 has been erroneously selected, and the line-of-sight meets the manipulation target object J3 as an example of the cancel operation. Note that mainly presumed herein is a case where the cancel operation is manipulation in which the line-of-sight meets the manipulation target object J3, but the cancel operation is not limited to the manipulation in which the line-of-sight meets the manipulation target object J3.

In FIG. 12, the position that the line-of-sight of the user U1 meets is indicated as a position Q52. At this time, the display control unit 129 cancels the display of the help screen. Thereafter, the line-of-sight of the user U1 attempts to meet the manipulation target object J1 in order to select the manipulation target object J1. However, the situation, in which the detection result of the position that the line-of-sight of meets is the position of the manipulation target object J2 which is different from the actual position that the line-of-sight meets (the position of the manipulation target object J1), may possibly occur again.

Accordingly, the calibration execution unit 128 should execute the recalibration in a case where the same manipulation has been performed more than a predetermined number of times within a predetermined period of time. Specifically, the calibration execution unit 128 may execute the recalibration in a case where the selection operation based on the line-of-sight for the manipulation target object J2 has been performed more than the predetermined number of times within the predetermined period of time. Note that the predetermined number of times is not particularly limited. For example, the predetermined number of times may be any number as long as the number is two or more.

Figure 13:
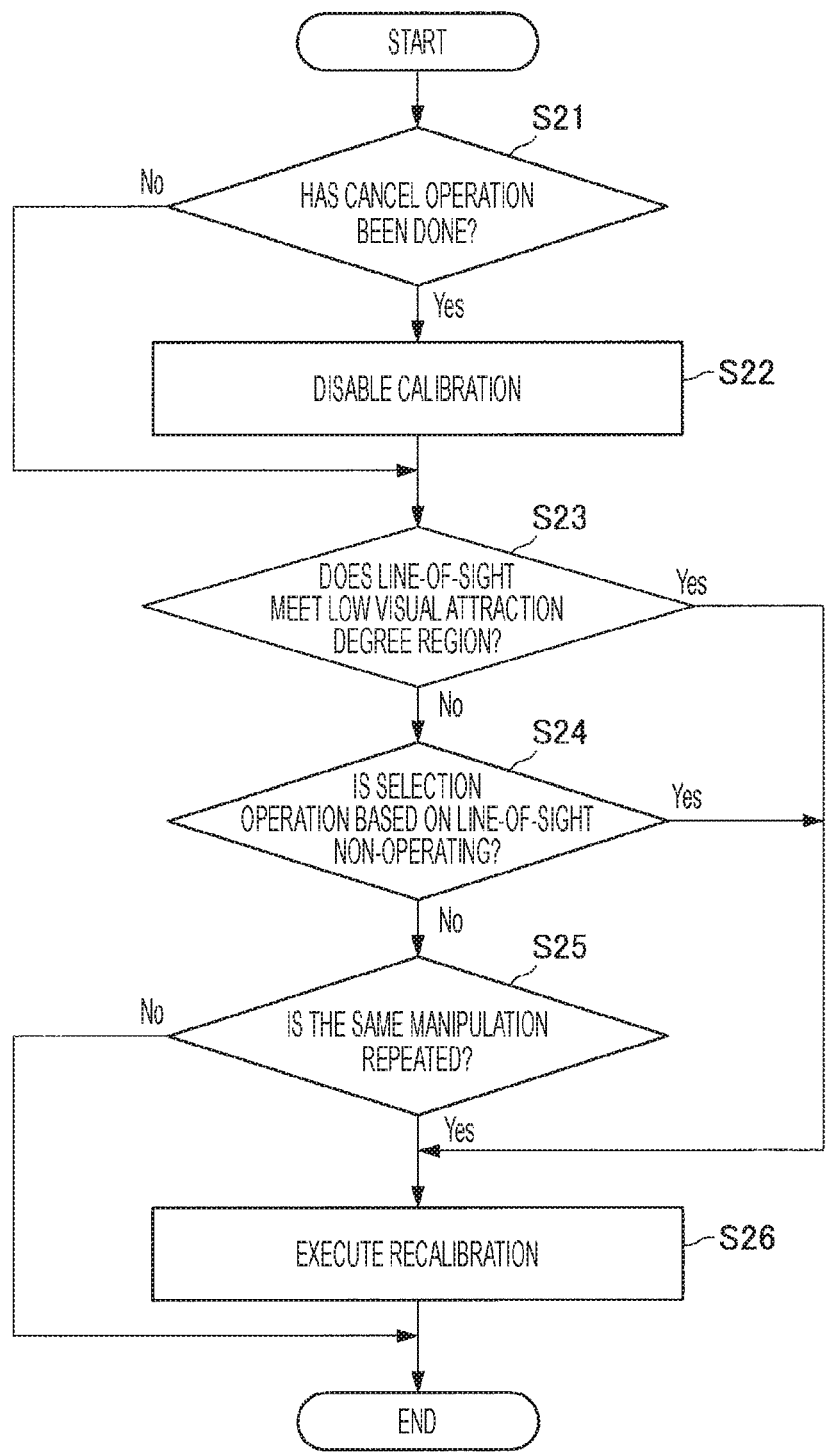
FIG. 13 is a flowchart showing an operation example of the recalibration.

Next, an operation example of the recalibration according to the present embodiment will be described. FIG. 13 is a flowchart showing the operation example of the recalibration according to the present embodiment. As shown in FIG. 13, in a case where the user has done the cancel operation ("Yes" in S21) the calibration execution unit 128 disables the calibration for the target object that the line-of-sight was meeting immediately before the cancel operation (S22) and shifts the operation to S23. On the other hand, in a case where the user does not do the cancel operation ("No" in S21), the calibration execution unit 128 shifts the operation to S23.

Subsequently, on the basis of the visual attraction degrees of the group of the objects calculated by the visual attraction degree calculation unit 123, the calibration execution unit 128 detects a region with a visual attraction degree lower than the fourth threshold as a low visual attraction degree region. In a case where the line-of-sight meets this low visual attraction degree region ("Yes" in S23), the calibration execution unit 128 shifts the operation to S26. On the other hand, in a case where the line-of-sight does not meet this low visual attraction degree region ("No" in S23), the calibration execution unit 128 shifts the operation to S24.

Subsequently, the calibration execution unit 128 determines whether or not the selection operation based on the line-of-sight of the user is not executed (S24). More specifically, the calibration execution unit 128 determines whether or not the selection operation based on the line-of-sight for the manipulation target object is not executed although the line-of-sight of the user acquired by the line-of-sight information acquisition unit 127 meets in the predetermined range over the predetermined period of time. In a case where the selection operation based on the line-of-sight of the user is not executed ("Yes" in S24), the calibration execution unit 128 shifts the operation to S26. On the other hand, in a case where the selection operation based on the line-of-sight of the user is executed ("No" in S24), the calibration execution unit 128 shifts the operation to S25.

Subsequently, the calibration execution unit 128 determines whether or not the same manipulation is repeated (S25). More specifically, the calibration execution unit 128 determines whether or not the same manipulation has been performed more than the predetermined number of times within the predetermined period of time. In a case where the same manipulation is repeated ("Yes" in S25), the calibration execution unit 128 executes the recalibration (S26) and ends the operation. On the other hand, in a case where the same operation is not repeated ("No" in S25), the calibration execution unit 128 ends the operation.

The operation example of the recalibration according to the present embodiment has been described above.

1.3.3. Various Modification Examples

As described above, the calibration according to the present embodiment is executed. Furthermore, as described above, the recalibration according to the present embodiment may be executed. Herein, the technique of detecting a target object (e.g., the building B3) utilized for the calibration (hereinafter, also referred to as "the technique already described") has already been described. However, a technique according to a modification example may be utilized to detect a target object utilized for the calibration. Hereinafter, the technique according to this modification example will be described.

Note that the detection of a target object by the technique according to the modification example may be performed at any timing. As one example, the detection of a target object by the technique according to the modification example may be performed in a case where the target object is not detected by the technique already described. Alternatively, as another example, the detection of a target object by the technique according to the modification example may be performed before the detection of the target object by the technique already described is attempted.

Figure 14:
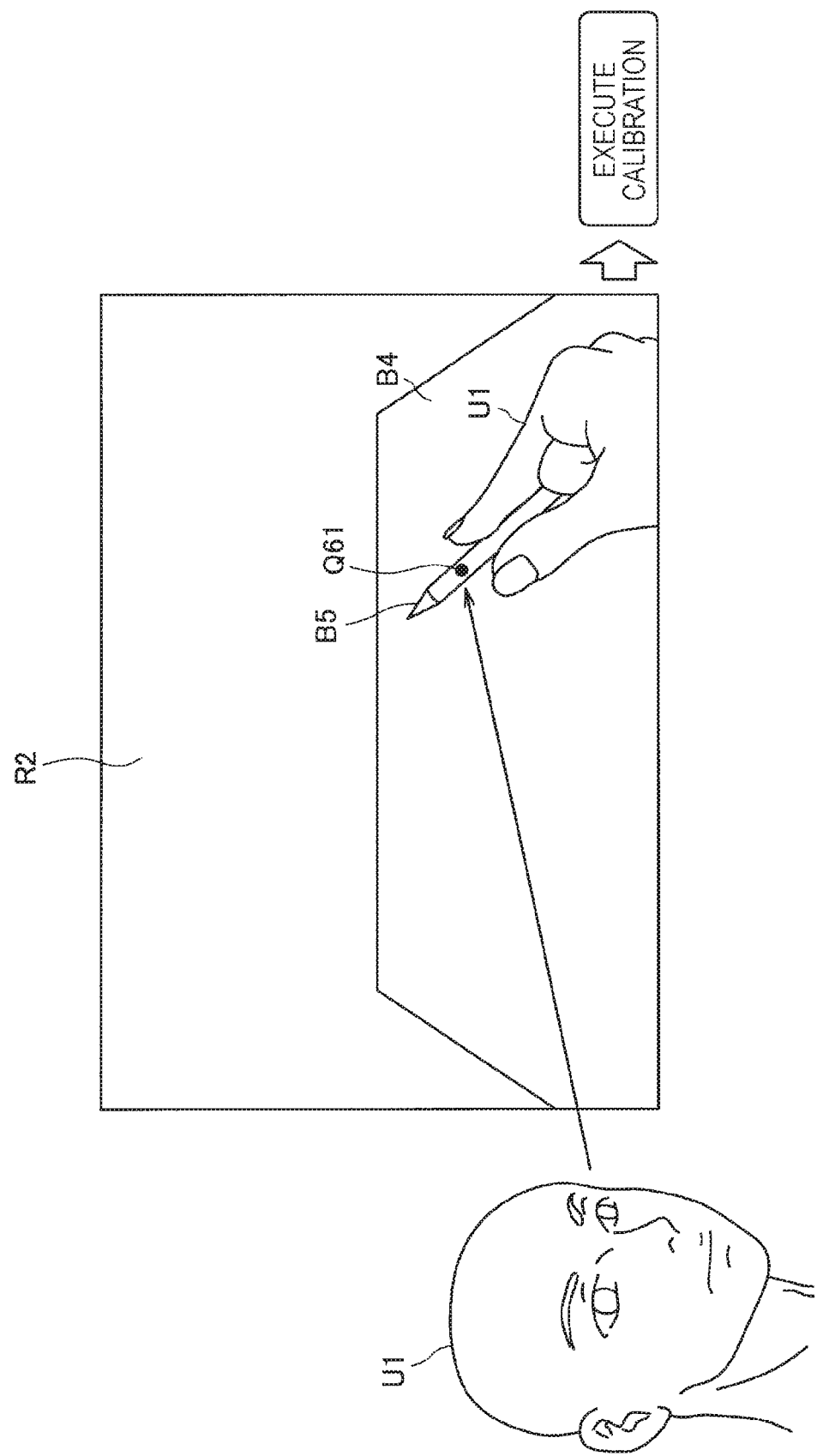
FIG. 14 is a diagram for describing a first example of a technique according to a modification example.

FIG. 14 is a diagram for describing a first example of the technique according to the modification example. As shown in FIG. 14, in the visual field of a user U1, a desk B4 and a writing instrument B5 exist as an example of one or a plurality of objects existing in a real space R2. Then, the user U1 tries to take the writing instrument B5 placed on the desk B4. Therefore, a position Q61 that the line-of-sight of the user U1 meets exists at the writing instrument B5. Thus, the user U1 is highly likely to be looking at the writing instrument B5 that the user U1 is trying to take.

Similarly, in a case where the gesture of the user U1 is a predetermined gesture, it is considered that the line-of-sight of the user U1 highly likely meets the object existing at the position corresponding to the position at which the gesture has been made. Specifically, an object recognition unit 122 recognizes the gesture of the user U1 from a visual field analysis image captured by a visual field analysis imaging unit 111. Then, a target object detection unit 124 determines whether or not the gesture recognized by the object recognition unit 122 is the predetermined gesture.

Then, in a case where the gesture recognized by the object recognition unit 122 is the predetermined gesture, the target object detection unit 124 detects, as a target object, an object existing at a position corresponding to the position at which the gesture has been made. More specifically, in a case where the gesture recognized by the object recognition unit 122 is the predetermined gesture, the target object detection unit 124 identifies the correspondence between the position at which the gesture has been made and the position of the object for the gesture. Such correspondence may be registered in advance or may be estimated by the target object detection unit 124 on the basis of predetermined algorithm. Then, the target object detection unit 124 detects, as the target object, the object for the gesture on the basis of the correspondence.

Note that the predetermined gesture may include at least one of a gesture of holding an object or a gesture of pointing at an object. FIG. 14 shows the case where the gesture of the user U1 is the gesture of holding an object. In this case, the target object detection unit 124 is only required to identify the correspondence between the positions of a plurality of fingers of the user U1 and the positions of the writing instrument B5 held by the plurality of fingers and detect, as the target object, the writing instrument B5 held by the plurality of fingers on the basis of the correspondence. A calibration execution unit 128 executes the calibration on the basis of the positions of the target object and the line-of-sight of the user U1.

Figure 15:
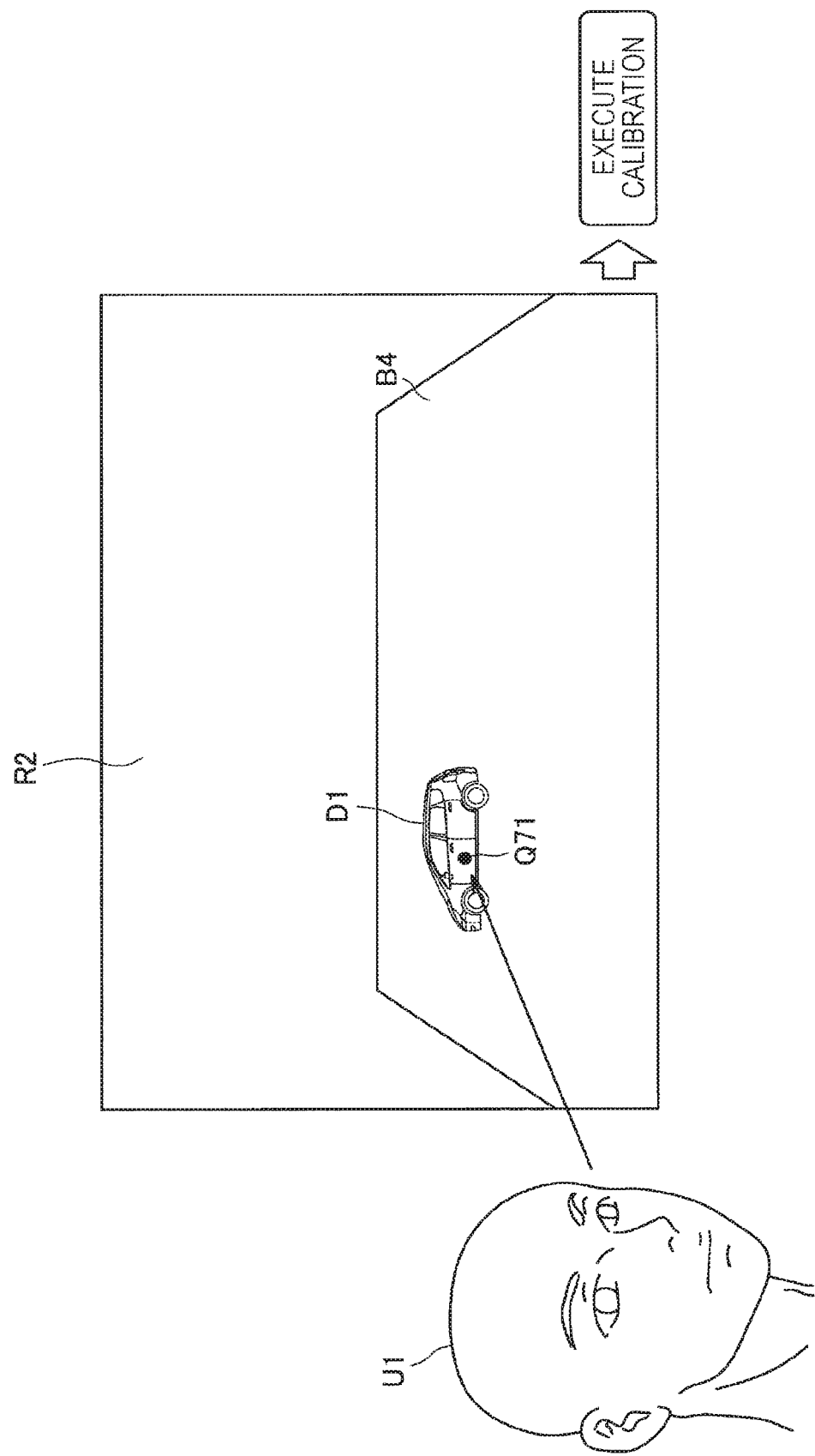
FIG. 15 is a diagram for describing a second example of the technique according to the modification example.

FIG. 15 is a diagram for describing a second example of the technique according to the modification example. As shown in FIG. 15, in the visual field of a user U1, a desk B4 exists as an example of one or a plurality of objects existing in a real space R2. Furthermore, a display control unit 129 controls a display unit 150 so that a display object D1 is displayed. Herein, presumed is a case where the position of the display object D1 is moving in order to increase the possibility that the line-of-sight of the user U1 meets the display object D1, but the position of the display object D1 does not have to change.

When the display object D1 is displayed in this manner, it is considered that the user U1 is highly likely to look at the display object D1. Therefore, a position Q71 that the line-of-sight of the user U1 meets exists in the display object D1. Accordingly, a target object detection unit 124 is only required to detect the display object D1 as a target object. A calibration execution unit 128 executes the calibration on the basis of the position of the target object and user line-of-sight information of the user U1.

Figure 16:
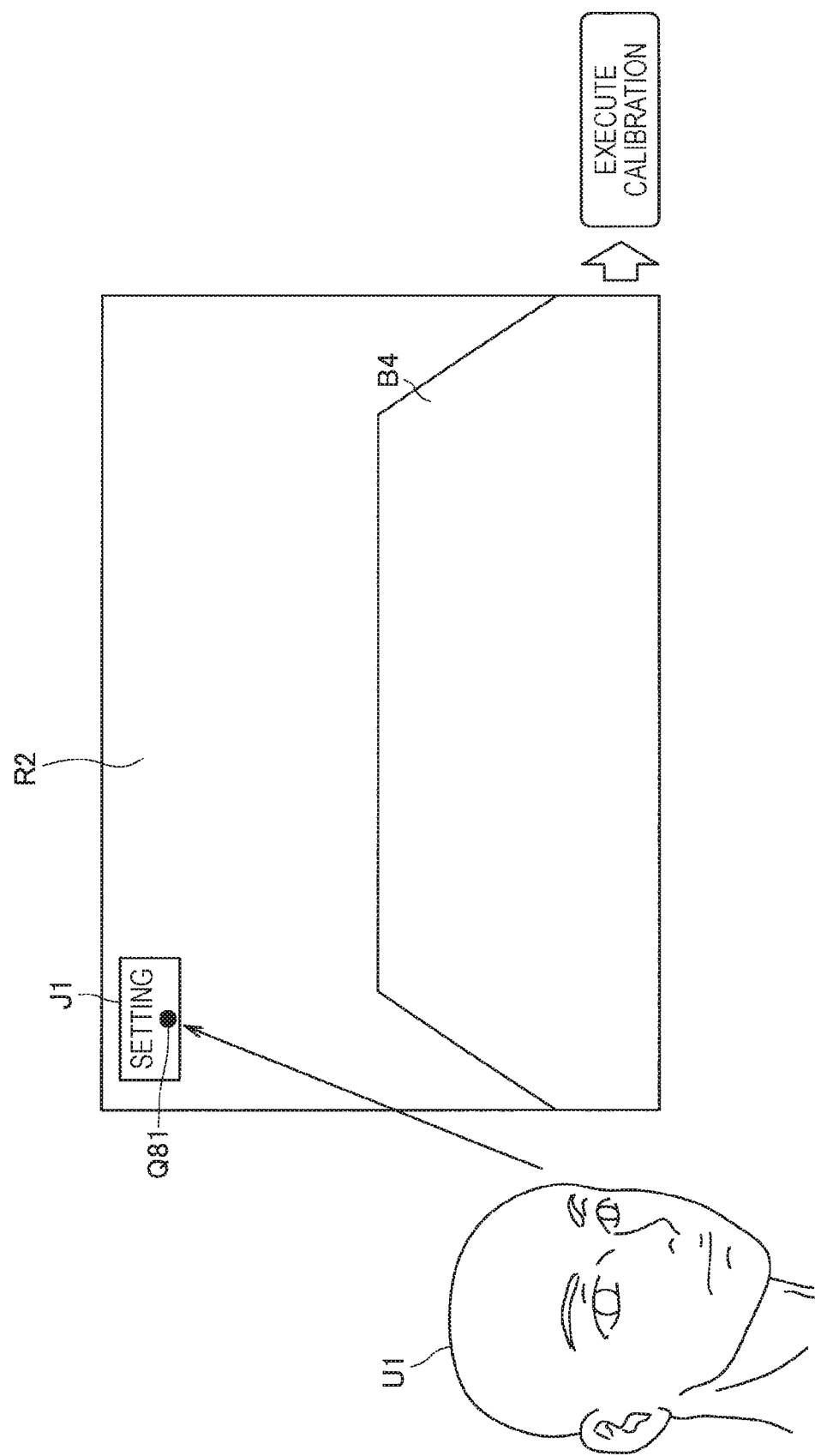
FIG. 16 is a diagram for describing a third example of the technique according to the modification example.

FIG. 16 is a diagram for describing a third example of the technique according to the modification example. As shown in FIG. 16, in the visual field of the user U1, a desk B4 exists as one or a plurality of objects existing in a real space R2. Furthermore, a display control unit 129 controls a display unit 150 so that a manipulation target object J1 is displayed. Also in the example shown in FIG. 16, similar to the example shown in FIG. 10, the manipulation target object J1 is a setting button, but the manipulation target object J1 is not limited to the setting button.

When the manipulation target object J1 is displayed in this manner, it is considered that the user U1 is highly likely to look at the manipulation target object J1. Therefore, a position Q81 that the line-of-sight of the user U1 meets exists in the manipulation target object J1. Accordingly, a target object detection unit 124 is only required to detect the manipulation target object J1 as a target object. A calibration execution unit 128 executes the calibration on the basis of the positions of the target object and the line-of-sight of the user U1.

2. Hardware Configuration Example

Figure 17:
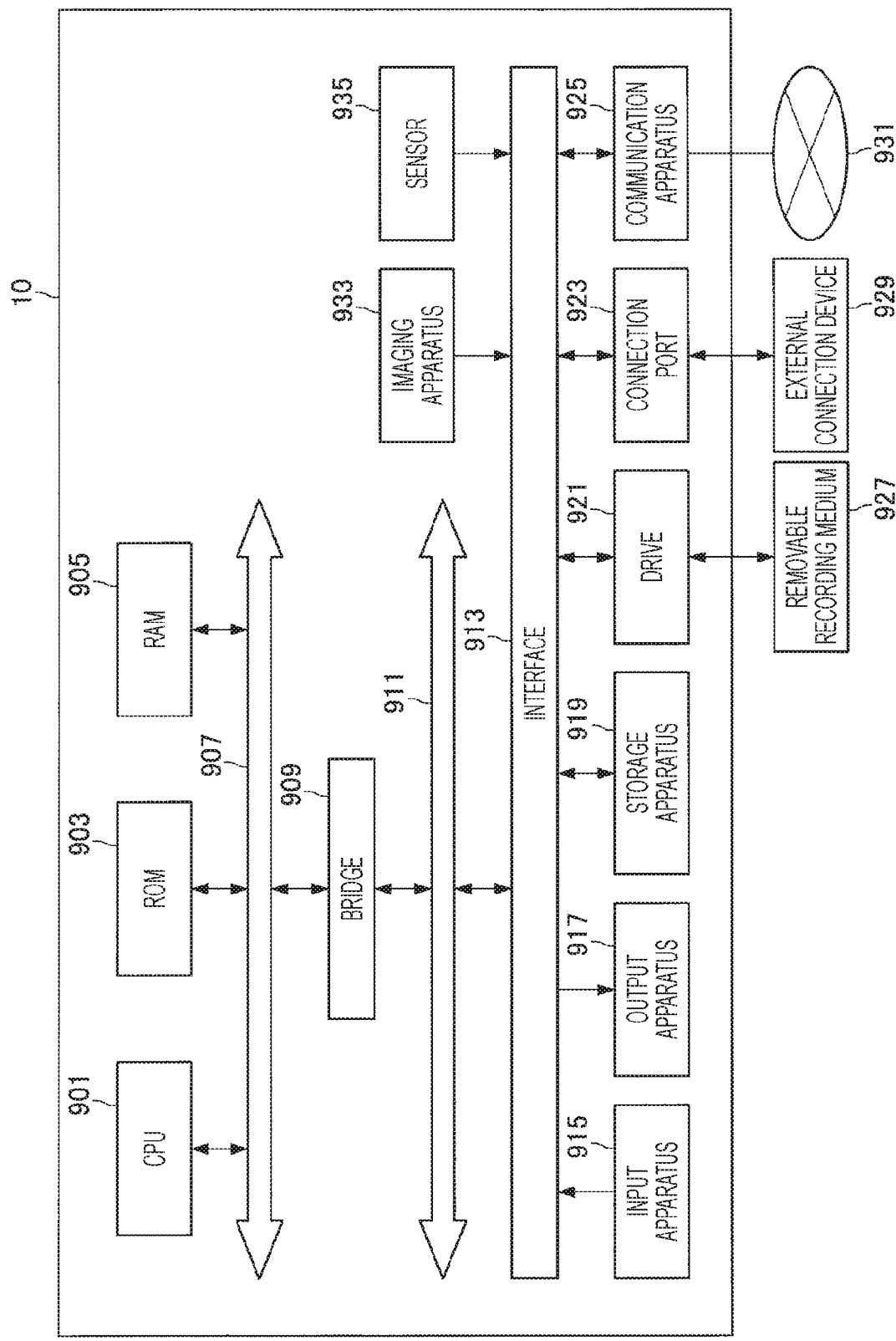
FIG. 17 is a block diagram showing a hardware configuration example of the information processing apparatus.

Next, a hardware configuration example of the information processing apparatus 10 according to the embodiment of the present disclosure will be described with reference to FIG. 17. FIG. 17 is a block diagram showing the hardware configuration example of the information processing apparatus 10 according to the embodiments of the present disclosure.

As shown in FIG. 17, the information processing apparatus 10 includes a central processing unit (CPU) 901, a read only memory (ROM) 903 and a random access memory (RAM) 905. Furthermore, the information processing apparatus 10 may include a host bus 907, a bridge 909, an external bus 911, an interface 913, an input apparatus 915, an output apparatus 917, a storage apparatus 919, a drive 921, a connection port 923 and a communication apparatus 925. Moreover, the information processing apparatus 10 may include an imaging apparatus 933 and a sensor 935 as necessary. Instead of or in addition to the CPU 901, the information processing apparatus 10 may include a processing circuit called a digital signal processor (DSP) or an application specific integrated circuit (ASIC).

The CPU 901 functions as an arithmetic processing unit and a control unit and controls the entire or partial operation in the information processing apparatus 10 according to various programs recorded on the ROM 903, the RAM 905, the storage apparatus 919, or a removable recording medium 927. The ROM 903 stores programs, arithmetic operation parameters, and the like, which are used by the CPU 901. The RAM 905 temporarily stores programs used in the execution of the CPU 901, parameters that change as appropriate in the execution, and the like. The CPU 901, the ROM 903 and the RAM 905 are connected to each other by the host bus 907 constituted by an internal bus such as a CPU bus. Moreover, the host bus 907 is connected to the external bus 911, such as a peripheral component interconnect/interface (PCI) bus, via the bridge 909.

The input apparatus 915 is an apparatus manipulated by the user, such as, for example, a mouse, a keyboard, a touch panel, a button, a switch and a lever. The input apparatus 915 may include a microphone that detects the voice of the user. The input apparatus 915 may be, for example, a remote control apparatus utilizing infrared rays or other electric waves or may be an external connection device 929, such as a mobile phone, supporting the manipulation of the information processing apparatus 10. The input apparatus 915 includes an input control circuit that generates an input signal on the basis of the information input by the user and outputs the input signal to the CPU 901. The user manipulates this input apparatus 915 to input various data into the information processing apparatus 10 and instruct the information processing apparatus 10 to perform processing operation. Furthermore, the imaging apparatus 933 as described later can also function as the input apparatus by imaging the motion of the hand of the user, the finger of the user, or the like. At this time, a pointing position may be decided according to the motion of the hand or the direction of the finger.

The output apparatus 917 is constituted by an apparatus capable of visually or auditorily notifying the user of the acquired information. For example, the output apparatus 917 can be a display apparatus, such as a liquid crystal display (LCD), a plasma display panel (PDP), an organic electroluminescence (EL) display or a projector, a hologram display apparatus, an audio output apparatus such as a speaker or a headphone, as well as a printer apparatus, or the like. The output apparatus 917 outputs the result obtained by the processing of the information processing apparatus 10 as a picture such as a text or an image or outputs the result as sound such as voice or audio. Furthermore, the output apparatus 917 may include a light for brightening the surroundings.

The storage apparatus 919 is a data storage apparatus constituted as one example of a storage unit of the information processing apparatus 10. The storage apparatus 919 is constituted by, for example, a magnetic storage unit device such as a hard disk drive (HDD), a semiconductor storage device, an optical storage device, a magneto-optical storage device, or the like. This storage apparatus 919 stores programs executed by the CPU 901 and various data as well as various data acquired from the outside, and the like.

The drive 921 is a reader/writer for the removable recording medium 927 such as a magnetic disk, an optical disk, a magneto-optical disk, or a semiconductor memory and is built in the information processing apparatus 10 or externally attached thereto. The drive 921 reads out the information recorded on the attached removable recording medium 927 and outputs the information to the RAM 905. Furthermore, the drive 921 writes a record in the attached removable recording medium 927.

The connection port 923 is a port for directly connecting the device to the information processing apparatus 10. The connection port 923 can be, for example, a universal serial bus (USB) port, an IEEE 1394 port, a small computer system interface (SCSI) port, or the like. Furthermore, the connection port 923 may be an RS-232C port, an optical audio terminal, a high-definition multimedia interface (HDMI (registered trademark)) port, or the like. By connecting the external connection device 929 to the connection port 923, various data can be exchanged between the information processing apparatus 10 and the external connection device 929.

The communication apparatus 925 is, for example, a communication interface constituted by a communication device or the like for connecting to a communication network 931. The communication apparatus 925 can be, for example, a communication card for a wired or wireless local area network (LAN), Bluetooth (registered trademark), or a wireless USB (WUSB). Furthermore, the communication apparatus 925 may be a router for optical communication, a router for an asymmetric digital subscriber line (ADSL), or a modem for various kinds of communication. For example, the communication apparatus 925 transmits and receives signals and the like to and from the Internet and other communication devices by using a predetermined protocol such as TCP/IP. Moreover, the communication network 931 connected to the communication apparatus 925 is a network connected by wire or wireless, and is, for example, the Internet, a home LAN, infrared communication, radio wave communication, satellite communication, or the like.

The imaging apparatus 933 is an apparatus that images a real space by using various members, such as an imaging element (e.g., a charged coupled device (CCD) or a complementary metal oxide semiconductor (CMOS)) and a lens for controlling the formation of a subject image on the imaging element, and generates a captured image. The imaging apparatus 933 may capture a still image or may capture a moving image.

The sensor 935 is, for example, various sensors such as a distance measuring sensor, an acceleration sensor, a gyro sensor, a geomagnetic sensor, an optical sensor and a sound sensor. The sensor 935 acquires, for example, information regarding the state of the information processing apparatus 10 itself, such as the posture of the casing of the information processing apparatus 10, and information regarding the surrounding environment of the information processing apparatus 10, such as brightness and noise around the information processing apparatus 10. Furthermore, the sensor 935 may include a GPS sensor that receives a global positioning system (GPS) signal and measures the latitude, longitude and altitude of the apparatus.

3. Conclusion

As described above, according to the embodiments of the present disclosure, provided is an information processing apparatus 10 including: a line-of-sight information acquisition unit 127 configured to acquire user line-of-sight information; and a calibration execution unit 128 configured to execute calibration on the basis of a position of a target object in a visual field and the line-of-sight information in a case where the target object, which has a visual attraction degree higher than a first threshold and a size in a predetermined direction smaller than a predetermined size, has been detected from the visual field of the user. According to such configuration, it is possible to enable the calibration of the line-of-sight to be executed more naturally.

Although the preferred embodiments of the present disclosure have been described in detail with reference to the accompanying drawings, the technical scope of the present disclosure is not limited to these examples. It is obvious that a person ordinarily skilled in the art of the present disclosure can arrive at various changing examples or modification examples within the scope of the technical idea described in the claims, and it is to be understood that these are also within the technical scope of the present disclosure as a matter of course.

For example, the example, in which the visual attraction degree calculation unit 123 calculates the visual attraction degrees of the group of the objects when the target object detection unit 124 detects, on the basis of the visual attraction degrees of the group of the objects, the target object utilized for the calibration, has been described above. However, the visual attraction degree calculation unit 123 may calculate in advance the visual attraction degrees of the group of the objects in a case, for example, where an image containing the target object utilized for the calibration can be acquired in advance.

Furthermore, the target object detected by the target object detection unit 124 may be different depending on the user. For example, the target object detected by the target object detection unit 124 may be detected on the basis of user preference information. Moreover, the target object detected by the target object detection unit 124 may be detected on the basis of the line-of-sight of another user. At this time, another user may be a user whose preference information is similar to that of the user.

Further, the information indicating the object that the line-of-sight of the user meets may be accumulated as a past history. Accordingly, in a case where the object indicated by the past history of the user comes into the visual field of the user again, the target object detection unit 124 may determine that the object is highly likely to be looked at by the user and, therefore, preferentially detect the object as the target object.

Furthermore, in order for the target object detection unit 124 to draw more visual attention of the user to the target object, the display control unit 129 may control a predetermined object to be displayed at the position for the target object by the target object detection unit 124. For example, the object whose display is controlled by the display control unit 129 may be a frame surrounding the periphery of the target object, may be coloring on the target object itself or the periphery of the target object, or flickering of the target object itself or the periphery of the target object.

Moreover, it is also possible to create a program for causing the hardware such as CPU, ROM and RAM built in the computer to exhibit functions equivalent to the functions of the control unit 120 described above. Further, a computer-readable recording medium on which the program is recorded can also be provided.

For example, as long as the operation of the information processing apparatus 10 described above is realized, the position of each constituent is not particularly limited. Part of the processing of each unit in the information processing apparatus 10 may be performed by a server apparatus (not shown). As one specific example, each partial or entire block of the control unit 120 in the information processing apparatus 10 may exist in the server apparatus (not shown) or the like. For example, the partial or entire functions of the object recognition unit 122, the visual attraction degree calculation unit 123, the target object detection unit 124, the prediction information generation unit 125 and the gesture recognition unit 126 in the information processing apparatus 10 may exist in the server apparatus (not shown) or the like.

Furthermore, the effects described in this specification are merely illustrative or exemplary, and not limited. That is, the technology according to the present disclosure can exert other effects obvious to those skilled in the art from the description of this specification, together with the above-described effects or instead of the above-described effects.

Note that the following configurations also within the technical scope of the present disclosure.

(1)

An information processing apparatus including:

a line-of-sight information acquisition unit configured to acquire line-of-sight information of a user; and a calibration execution unit configured to execute calibration on the basis of a position of a target object in a visual field and the line-of-sight information, the target object having a visual attraction degree higher than a first threshold and a size in a predetermined direction smaller than a predetermined size, in a case where the target object has been detected from the visual field of the user.

(2)

The information processing apparatus according to (1), further including a target object detection unit configured to detect the target object.

(3)

The information processing apparatus according to (2), in which the target object detection unit is configured to detect the target object in a case where motion of the visual field is less than predetermined motion.

(4)

The information processing apparatus according to (2) or (3), in which the target object detection unit is configured not to detect one object as the target object in a case where another object is located at a distance from the one object shorter than a predetermined distance, the another object having a visual attraction degree higher than a second threshold.

(5)

The information processing apparatus according to any one of (2) to (4), in which the target object detection unit is configured to detect, as the target object, an object which exists at a position corresponding to a position at which a gesture has been made, in a case where the gesture of the user is a predetermined gesture.

(6)

The information processing apparatus according to (5), in which the predetermined gesture includes at least one of a gesture of holding the object or a gesture of pointing at the object.

(7)

The information processing apparatus according to any one of (1) to (6), in which the calibration execution unit is configured to control whether or not to execute the calibration on the basis of prediction information regarding line-of-sight motion.

(8)

The information processing apparatus according to (7), further including a prediction information generation unit configured to generate, as the prediction information regarding the line-of-sight motion, information in which respective positions of a plurality of objects are arranged in descending order of visual attraction degrees, in a case where the plurality of the objects has been detected from the visual field of the user, the plurality of the objects having visual attraction degrees higher than a third threshold.

(9)

The information processing apparatus according to (7) or (8), in which the calibration execution unit is configured not to execute the calibration in a case where a matching degree between the prediction information regarding the line-of-sight motion and actual measurement information regarding the line-of-sight motion does not exceed a predetermined reference value.

(10)

The information processing apparatus according to (9), in which the calibration execution unit is configured to execute the calibration in a case where the matching degree exceeds the reference value.

(11)

The information processing apparatus according to any one of (1) to (10), in which the calibration execution unit is configured to execute the calibration for a direction substantially parallel to the predetermined direction in a case where the target object has been detected.

(12)

The information processing apparatus according to any one of (1) to (11), in which the calibration execution unit is configured to execute the calibration in a case where a line-of-sight exists, over a predetermined period of time, in a region with the visual attraction degree lower than a fourth threshold.

(13)

The information processing apparatus according to any one of (1) to (12), in which the calibration execution unit is configured to execute the calibration in a case where a state of manipulation by the line-of-sight of the user is a predetermined state.

(14)

The information processing apparatus according to (13), in which the calibration execution unit is configured to execute the calibration in a case where selection operation based on the line-of-sight is not executed although the line-of-sight meets in a predetermined range over a predetermined period of time.

(15)

The information processing apparatus according to (13), in which the calibration execution unit is configured to execute the calibration in a case where same manipulation has been performed more than a predetermined number of times within a predetermined period of time.

(16)

The information processing apparatus according to any one of (1) to (15), in which the calibration execution unit is configured to execute the calibration on the basis of a position of a predetermined display object and the line-of-sight information, in a case where the target object is not detected from the visual field of the user.

(17)

The information processing apparatus according to any one of (1) to (15), in which the calibration execution unit is configured to execute the calibration on the basis of a position of a manipulation target object manipulatable by the user and the line-of-sight information, in a case where the target object is not detected from the visual field of the user.

(18)

The information processing apparatus according to any one of (1) to (17), in which the calibration execution unit is configured to disable calibration for a target object that a line-of-sight was meeting immediately before cancel operation, in a case where the user has done the cancel operation.

(19)

An information processing method including:

acquiring line-of-sight information of a user; and executing calibration by a processor on the basis of a position of a target object in a visual field and the line-of-sight information, the target object having a visual attraction degree higher than a first threshold and a size in a predetermined direction smaller than a predetermined size, in a case where the target object has been detected from the visual field of the user.

(20)

A program for causing a computer to function as an information processing apparatus, the information processing apparatus including:

a line-of-sight information acquisition unit configured to acquire line-of-sight information of a user; and a calibration execution unit configured to execute calibration on the basis of a position of a target object in a visual field and the line-of-sight information, the target object having a visual attraction degree higher than a first threshold and a size in a predetermined direction smaller than a predetermined size, in a case where the target object has been detected from the visual field of the user.

REFERENCE SIGNS LIST

10 Information processing apparatus
111 Visual field analysis imaging unit
112 Line-of-sight detection imaging unit
113 Sensor unit
120 Control unit
121 Acquisition unit
122 Object recognition unit
123 Visual attraction degree calculation unit
124 Target object detection unit
125 Prediction information generation unit
126 Gesture recognition unit
127 Line-of-sight information acquisition unit
128 Calibration execution unit
129 Display control unit
130 Storage unit
140 Communication unit
150 Display unit

The invention claimed is:

1. An information processing apparatus, comprising:
a line-of-sight information acquisition unit configured to acquire line-of-sight information of a user; and
a calibration execution unit configured to execute calibration of the line-of-sight information based on a position of a target object in a visual field and the line-of-sight information, wherein
the target object has a visual attraction degree higher than a first threshold degree,
the visual attraction degree is a numerical value indicating how much visual attention is paid by the user,
the target object has a size in a specific direction smaller than a specific size, in a case where the target object has been detected from the visual field of the user, and
the calibration is executed for a direction parallel to the specific direction.

2. The information processing apparatus according to claim 1, further comprising a target object detection unit configured to detect the target object.

3. The information processing apparatus according to claim 2, wherein the target object detection unit is configured to detect the target object in a case where motion of the visual field is less than a specific motion.

4. The information processing apparatus according to claim 2, wherein the target object detection unit is configured not to detect one object as the target object in a case where another object is located at a distance from the one object shorter than a predetermined distance, the another object having a visual attraction degree higher than a second threshold degree.

5. The information processing apparatus according to claim 2, wherein the target object detection unit is configured to detect, as the target object, an object which exists at the position corresponding to a position at which a gesture has been made, in a case where the gesture of the user is a specific gesture.

6. The information processing apparatus according to claim 5, wherein the specific gesture includes at least one of a gesture of holding the object or a gesture of pointing at the object.

7. The information processing apparatus according to claim 1, wherein the calibration execution unit is further configured to control whether to execute the calibration based on prediction information regarding line-of-sight motion.

8. The information processing apparatus according to claim 7, further comprising a prediction information generation unit configured to generate, as the prediction information regarding the line-of-sight motion, information in which respective positions of a plurality of objects are in a descending order of visual attraction degrees of the plurality of objects, in a case where the plurality of the objects are detected from the visual field of the user, the plurality of the objects having the visual attraction degrees higher than a third threshold degree.

9. The information processing apparatus according to claim 7, wherein the calibration execution unit is further configured not to execute the calibration in a case where a matching degree between the prediction information regarding the line-of-sight motion and actual measurement information regarding the line-of-sight motion does not exceed a reference value.

10. The information processing apparatus according to claim 9, wherein the calibration execution unit is further configured to execute the calibration in a case where the matching degree exceeds the reference value.

11. The information processing apparatus according to claim 1, wherein the calibration execution unit is further configured to execute the calibration in a case where a line-of-sight exists, over a period of time, in a region with the visual attraction degree lower than a fourth threshold degree.

12. The information processing apparatus according to claim 1, wherein the calibration execution unit is further configured to execute the calibration in a case where a state of manipulation by a line-of-sight of the user is a specific state.

13. The information processing apparatus according to claim 12, wherein the calibration execution unit is configured to execute the calibration in a case where a selection operation based on the line-of-sight is not executed although the line-of-sight meets in a range over a period of time.

14. The information processing apparatus according to claim 12, wherein the calibration execution unit is configured to execute the calibration in a case where same manipulation is performed more than a number of times within a period of time.

15. The information processing apparatus according to claim 1, wherein the calibration execution unit is further configured to execute the calibration based on a position of a display object and the line-of-sight information, in a case where the target object is not detected from the visual field of the user.

16. The information processing apparatus according to claim 1, wherein the calibration execution unit is further configured to execute the calibration based on a position of a manipulation target object manipulatable by the user and the line-of-sight information, in a case where the target object is not detected from the visual field of the user.

17. The information processing apparatus according to claim 1, wherein the calibration execution unit is further configured to disable the calibration for the target object where a line-of-sight was meeting immediately before a cancel operation, based on the cancel operation by the user.

18. An information processing method, comprising:
in an information processing apparatus:
acquiring line-of-sight information of a user; and executing calibration of the line-of-sight information based on a position of a target object in a visual field and the line-of-sight information, wherein
the target object has a visual attraction degree higher than a first threshold degree,
the visual attraction degree is a numerical value indicating how much visual attention is paid by the user,
the target object has a size in a specific direction smaller than a specific size, in a case where the target object has been detected from the visual field of the user, and
the calibration is executed for a direction parallel to the specific direction.

19. A non-transitory computer-readable medium having stored thereon, computer-executable instructions which, when executed by a computer cause the computer to execute operations, the operations comprising:
acquiring line-of-sight information of a user; and
executing calibration of the line-of-sight information based on a position of a target object in a visual field and the line-of-sight information, wherein
the target object has a visual attraction degree higher than a first threshold degree,
the visual attraction degree is a numerical value indicating how much visual attention is paid by the user,
the target object has a size in a specific direction smaller than a specific size, in a case where the target object has been detected from the visual field of the user, and
the calibration is executed for a direction parallel to the specific direction.

* * * * *